(12) United States Patent
Chen et al.

(10) Patent No.: US 8,463,837 B2
(45) Date of Patent: Jun. 11, 2013

(54) METHOD AND APPARATUS FOR EFFICIENT BI-LINEAR INTERPOLATION AND MOTION COMPENSATION

(75) Inventors: Yen-Kuang Chen, Sunnyvale, CA (US); Minerva M. Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 2127 days.

(21) Appl. No.: 10/687,953

(22) Filed: Oct. 17, 2003

(65) Prior Publication Data

US 2004/0139138 A1 Jul. 15, 2004

Related U.S. Application Data

(63) Continuation-in-part of application No. 09/952,891, filed on Oct. 29, 2001, now Pat. No. 7,085,795.

(51) Int. Cl.
*G06F 17/10* (2006.01)
(52) U.S. Cl.
USPC .......................................................... 708/603
(58) Field of Classification Search
USPC .......................................................... 708/603
See application file for complete search history.

(56) References Cited

U.S. PATENT DOCUMENTS

| 7,085,795 B2 * | 8/2006 | Debes et al. ................... 708/603 |
| 2004/0073589 A1 * | 4/2004 | Debes et al. ................... 708/523 |
| 2004/0117422 A1 * | 6/2004 | Debes et al. ................... 708/523 |
| 2004/0133617 A1 * | 7/2004 | Chen et al. ..................... 708/523 |

* cited by examiner

*Primary Examiner* — David H Malzahn
(74) *Attorney, Agent, or Firm* — Trop, Pruner & Hu, P.C.

(57) ABSTRACT

A method and apparatus for performing bi-linear interpolation and motion compensation including multiply-add operations and byte shuffle operations on packed data in a processor. In one embodiment, two or more lines of 2n+1 content byte elements may be shuffled to generate a first and second packed data respectively including at least a first and a second 4n byte elements including 2n−1 duplicated elements. A third packed data including sums of products is generated from the first packed data and packed byte coefficients by a multiply-add instruction. A fourth packed data including sums of products is generated from the second packed data and elements and packed byte coefficients by another multiply-add instruction. Corresponding sums of products of the third and fourth packed data are then summed, and may be rounded and averaged.

29 Claims, 34 Drawing Sheets

| 63 | 56 55 | 48 47 | 40 39 | 32 31 | 24 23 | 16 15 | 8 7 | 0 |
|---|---|---|---|---|---|---|---|---|
| Byte 7 | Byte 6 | Byte 5 | Byte 4 | Byte 3 | Byte 2 | Byte 1 | Byte 0 | |

Packed Byte 411

| 63 | | 48 47 | | 32 31 | | 16 15 | | 0 |
|---|---|---|---|---|---|---|---|---|
| Word 3 | | Word 2 | | Word 1 | | Word 0 | | |

Packed Word 412

| 63 | | | | 32 31 | | | | 0 |
|---|---|---|---|---|---|---|---|---|
| Doubleword 1 | | | | Doubleword 0 | | | | |

Packed Doubleword 413

| 63 | | | | | | | | 0 |
|---|---|---|---|---|---|---|---|---|
| Quadword 0 | | | | | | | | |

Quadword 414

FIG. 4a

| 127 112 111 | 96 95 | 80 79 | 64 63 | 48 47 | 32 31 | 16 15 | 0 |
|---|---|---|---|---|---|---|---|
| B15 B14 B13 B12 B11 B10 B9 B8 | | | | B7 B6 B5 B4 | B3 B2 | B1 B0 | |

Packed Byte 421

| 127 112 111 | 96 95 | 80 79 | 64 63 | 48 47 | 32 31 | 16 15 | 0 |
|---|---|---|---|---|---|---|---|
| Half 7 | Half 6 | Half 5 | Half 4 | Half 3 | Half 2 | Half 1 | Half 0 |

Packed Half 422

| 127 | 96 95 | 64 63 | 32 31 | 0 |
|---|---|---|---|---|
| Single 3 | Single 2 | Single 1 | Single 0 |

Packed Single 423

| 127 | 64 63 | 0 |
|---|---|---|
| Double 1 | Double 0 |

Packed Double 424

FIG. 4b

| 63 | 56 55 | 48 47 | 40 39 | 32 31 | 24 23 | 16 15 | 8 7 | 0 |
|---|---|---|---|---|---|---|---|---|
| bbbb bbbb | bbbb bbbb | bbbb bbbb | bbbb bbbb | bbbb bbbb | bbbb bbbb | bbbb bbbb | bbbb bbbb | |

Unsigned packed byte in-register representation 510

| 63 | 56 55 | 48 47 | 40 39 | 32 31 | 24 23 | 16 15 | 8 7 | 0 |
|---|---|---|---|---|---|---|---|---|
| sbbb bbbb | sbbb bbbb | sbbb bbbb | sbbb bbbb | sbbb bbbb | sbbb bbbb | sbbb bbbb | sbbb bbbb | |

Signed packed byte in-register representation 511

FIG. 5a

| 63 | 48 47 | 32 31 | 16 15 | 0 |
|---|---|---|---|---|
| bbbb bbbb bbbb bbbb | bbbb bbbb bbbb bbbb | bbbb bbbb bbbb bbbb | bbbb bbbb bbbb bbbb | |

Unsigned packed word in-register representation 512

| 63 | 48 47 | 32 31 | 16 15 | 0 |
|---|---|---|---|---|
| sbbb bbbb bbbb bbbb | sbbb bbbb bbbb bbbb | sbbb bbbb bbbb bbbb | sbbb bbbb bbbb bbbb | |

Signed packed word in-register representation 513

FIG. 5b

| 63 | 32 31 | 0 |
|---|---|---|
| bbbb bbbb bbbb bbbb bbbb bbbb bbbb bbbb | | bbbb bbbb bbbb bbbb bbbb bbbb bbbb bbbb |

Unsigned packed doubleword in-register representation 514

| 63 | 32 31 | 0 |
|---|---|---|
| sbbb bbbb bbbb bbbb bbbb bbbb bbbb bbbb | | sbbb bbbb bbbb bbbb bbbb bbbb bbbb bbbb |

Signed packed doubleword in-register representation 515

FIG. 5c

| 127 | 64 63 | 0 |
|---|---|---|
| bbbb ... bbbb bbbb bbbb | | bbbb ... bbbb bbbb bbbb |

Unsigned packed quadword in-register representation 516

| 127 | 64 63 | 0 |
|---|---|---|
| sbbb ... bbbb bbbb bbbb | | sbbb ... bbbb bbbb bbbb |

Signed packed quadword in-register representation 517

FIG. 5d

Multiply-add 1601 src1 (1612): a b b c c d d e f g g h h i i j src2 (1640): p q p q p q p q p q p q p q p q dest (1610): ap+bq  bp+cq  cp+dq  dp+eq  fp+gq  gp+hq  hp+iq  ip+jq

Multiply-add 1602 src1 (1622): f g g h h i i j k l l m m n n o src2 (1650): r s r s r s r s r s r s r s r s dest (1620): fr+gs  gr+hs  hr+is  ir+js  kr+ls  lr+ms  mr+ns  nr+os

Packed-add 1603 src1 (1610): ap+bq  bp+cq  cp+dq  dp+eq  fp+gq  gp+hq  hp+iq  ip+jq src2 (1620): fr+gs  gr+hs  hr+is  ir+js  kr+ls  lr+ms  mr+ns  nr+os dest (1611): A'  B'  C'  D'  F'  G'  H'  I'

FIG. 16a

METHOD AND APPARATUS FOR EFFICIENT BI-LINEAR INTERPOLATION AND MOTION COMPENSATION

RELATED APPLICATIONS

This is a continuation-in-part application claiming, under 35 U.S.C. §120, the benefit of the filing date of U.S. application Ser. No. 09/952,891, filed Oct. 29, 2001, now U.S. Pat. No. 7,085,795.

FIELD OF THE DISCLOSURE

This disclosure relates generally to techniques for compression and decompression of images and video. In particular, the disclosure relates to performing bi-linear interpolation and motion compensation using Single-Instruction-Multiple-Data (SIMD) operations.

BACKGROUND OF THE DISCLOSURE

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing (PC) experience will be even richer in audio-visual effects, as well as being easier to use, and more importantly, computing will merge with communications.

Accordingly, the display of images, as well as playback of audio and video data, which is collectively referred to herein as content, have become increasingly popular applications for current computing devices. Bi-linear interpolation and motion compensation are popular techniques for decompression and display of images and video. Quarter-pixel and eighth-pixel motion compensation of luminance content in prior decompression techniques have made use of Finite Impulse Response (FIR) filters for interpolation. However for fractional-pixel chrominance motion compensation, bi-linear interpolation may be used instead.

Recently bi-linear interpolations have been proposed by the Joint Video Team of the International Telecommunication Union (ITU) Video Coding Experts Group (VCEG) and the International Organization for Standardization/International Electrotechnical Commission (ISO/IEC) Motion Picture Experts Group (MPEG) for fractional-pixel chrominance motion compensation in accordance with the H.264 standard (see Final Committee Draft of ISO/IEC 14496-10 Advanced Video Coding). Although the number of chrominance components is typically only half of the number of luminance components, the processing required for motion compensation of both types of components may be substantially equal.

In some computer systems, processors are implemented to operate on values represented by a large number of bits (e.g., 32 or 64) using instructions that produce one result. For example, the execution of an add instruction will add together a first 64-bit value and a second 64-bit value and store the result as a third 64-bit value. However, media applications require the manipulation of large amounts of data which may be represented in a small number of bits. For example, image data typically requires 8 or 16 bits and sound data typically requires 8 or 16 bits. To improve efficiency of media applications, some prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process content of media applications.

Unfortunately, current methods and instructions target the general needs of compression/decompression and are not comprehensive. In fact, many architectures do not support a means for efficient bi-linear interpolation and motion compensation over a range of coefficient sizes and data types. In addition, data ordering within data storage devices such as SIMD registers, as well as a capability for partial data transfers between registers, are generally not supported. As a result, current architectures require unnecessary data type changes which minimizes the number of operations per instruction and significantly increases the number of clock cycles required to order data for arithmetic operations.

Therefore, there remains a need to overcome one or more of the limitations existing in the techniques above-described.

BRIEF DESCRIPTION OF THE DRAWINGS

The present invention is illustrated by way of example and not limitation in the figures of the accompanying drawings.

FIGS. 4a-4b illustrate packed data-types according to various alternative embodiments of the invention.

FIGS. 5a-5d illustrate in-register packed data representations according to various alternative embodiments of the invention.

FIGS. 16a-16b illustrate a flow diagram of one embodiment for a process using multiply-add operations to perform bi-linear interpolation and motion compensation.

DETAILED DESCRIPTION

Figure 1A:
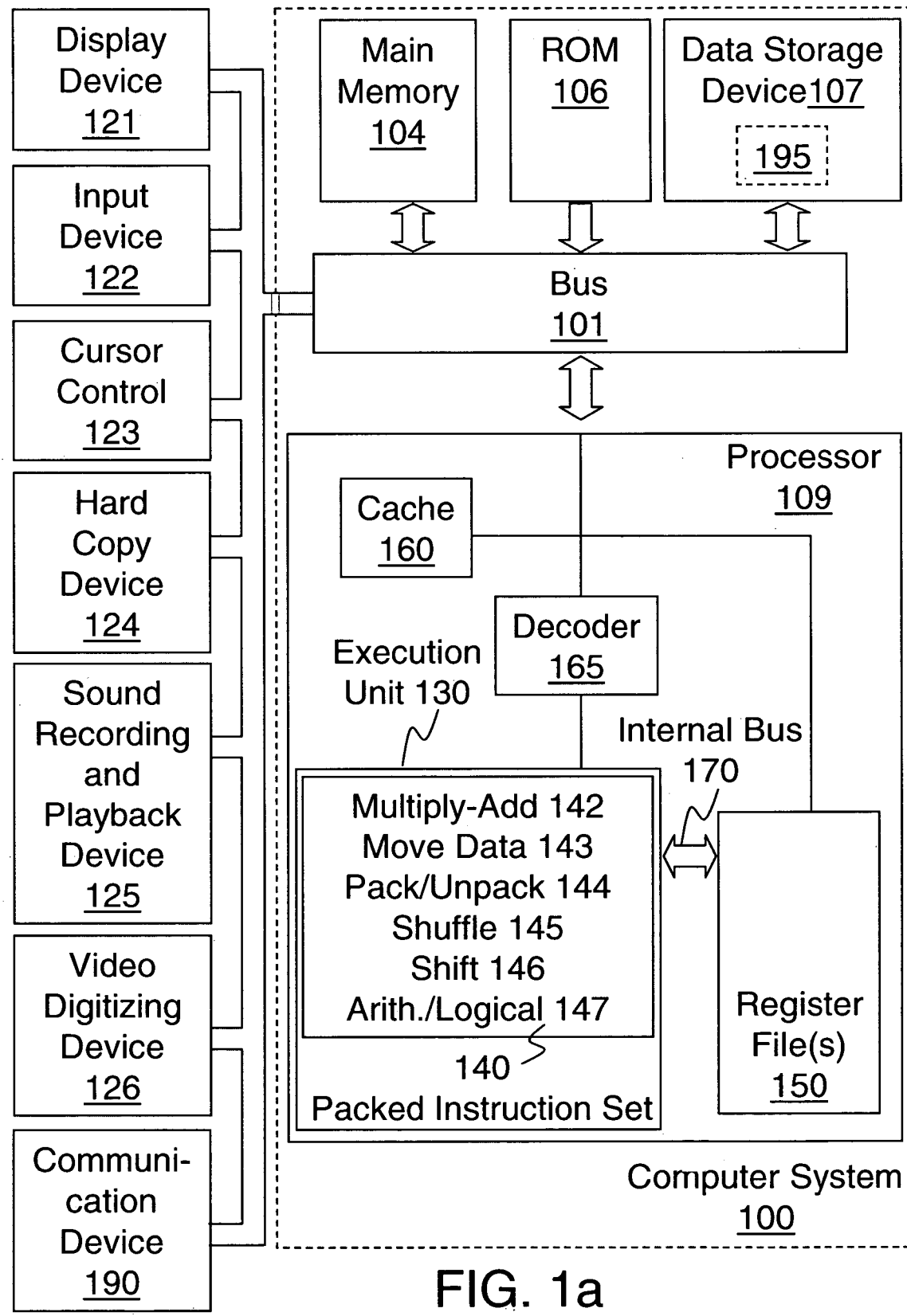
FIGS. 1a-1c illustrate exemplary computer systems according to various alternative embodiments of the invention.

A method and apparatus for efficient bi-linear interpolation and motion compensation of content data are described. In one embodiment, two or more lines of 2n+1 content byte elements may be shuffled to generate a first and second packed data respectively including at least a first and a second 4n byte elements including 2n–1 duplicated elements. A third packed data including sums of products is generated from the first packed data and packed byte coefficients by a multiply-add instruction. A fourth packed data including sums of products is generated from the second packed data and elements and packed byte coefficients by another multiply-add instruction. Corresponding sums of products of the third and fourth packed data are then summed, and may be rounded and averaged.

Further disclosed herein is a method and apparatus for including in a processor, multiply-add operations and byte shuffle operations on packed byte data. In one embodiment, a processor is coupled to a memory that stores a first packed byte data and a second packed byte data. The processor performs operations on said first packed byte data and said second packed byte data to generate a third packed data in response to receiving a multiply-add instruction. A plurality of the 16-bit data elements in this third packed data store the result of performing multiply-add operations on data elements in the first and second packed byte data. The order of byte elements in said first packed data may be adjusted in one of numerous ways to facilitate multiply-add operations by the processor performing data movement operations in response to receiving a shuffle instruction.

In one embodiment, methods of the present invention are embodied in machine-executable instructions. The instructions can be used to cause a general-purpose or special-purpose processor that is programmed with the instructions to perform the steps of the method. Alternatively, the steps of the method might be performed by specific hardware components that contain hardwired logic for performing the steps, or by any combination of programmed computer components and custom hardware components.

The present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. In some instances, well-known structures and devices may be omitted in order to avoid obscuring the details of the present invention. These examples and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Computer System

FIG. 1a illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1a also illustrates that processor 109 includes an execution unit 130, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes instructions in packed instruction set 140 for performing operations on packed data formats. Packed instruction set 140 includes instructions for supporting multiply-add and/or multiply-subtract operations. In addition, packed instruction set 140 may also include instructions for supporting a pack and an unpack operation, a packed shift operation, packed arithmetic operations (including a packed add operation, a packed subtract operation, a packed multiply operation, a packed a packed compare operation) and a set of packed logical operations (including packed AND, packed ANDNOT, packed OR, and packed XOR) as described in "A Set of Instructions for Operating on Packed Data," filed on Aug. 31, 1995, application number 521,360.

Packed instruction set 140 may also include one or more instructions for supporting: a move data operation; a data shuffle operation for organizing data within a data storage device; an adjacent-add instruction for adding adjacent bytes, words and doublewords, two word values, two words to produce a 16-bit result, two quadwords to produce a quadword result; and a register merger operation as are described in "An Apparatus and Method for Efficient Filtering and Convolution of Content Data," filed on Oct. 29, 2001, application Ser. No. 09/952,891.

Execution unit 130 is coupled to register file 150 by internal bus 170. Register file(s) 150 represents a storage area on processor 109 for storing information, including data. It is understood that one aspect of the invention is the described instruction set for operating on packed data. According to this aspect of the invention, the storage area used for storing the packed data is not critical. However, embodiments of the register file 150 are later described with reference to FIGS. 2a-2b. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

FIG. 1a additionally shows a data storage device 107 (e.g., a magnetic disk, optical disk, and/or other machine readable media) can be coupled to computer system 100. In addition, the data storage device 107 is shown including code 195 for execution by the processor 109. The code 195 can be written to cause the processor 109 to perform transformations, bilinear interpolation, filters or convolutions with the multiply-add/subtract instruction(s) for any number of purposes (e.g., motion video compression/decompression, image filtering, audio signal compression, filtering or synthesis, modulation/demodulation, etc.). Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer network. Computer system 100 optionally includes video digitizing device 126 and/or a communications device 190 (e.g., a serial communications chip, a wireless interface, an ethernet chip or a modem, which provides communications with an external device or network). Video digitizing device 126 can be used to capture video images that can be transmitted to others on the computer network.

In one embodiment, the processor 109 additionally supports an instruction set which is compatible with the x86 instruction set used by existing processors (such as the Pentium® processor) manufactured by Intel Corporation of Santa Clara, Calif. Thus, in one embodiment, processor 109 supports all the operations supported in the IA™-Intel Architecture, as defined by Intel Corporation of Santa Clara, Calif. (see "IA-32 Intel® Architecture Software Developers Manual Volume 2: Instruction Set Reference," Order Number 245471, available from Intel of Santa Clara, Calif. on the world wide web at developer.intel.com). As a result, processor 109 can support existing x86 operations in addition to the operations of the invention. Processor 109 may also be suitable for manufacture in one or more process technologies and by being represented on a machine readable media in sufficient detail, may be suitable to facilitate said manufacture. While the invention is described as being incorporated into an x86 based instruction set, alternative embodiments could incorporate the invention into other instruction sets. For example, the invention could be incorporated into a 64-bit processor using a new instruction set.

Figure 1B:
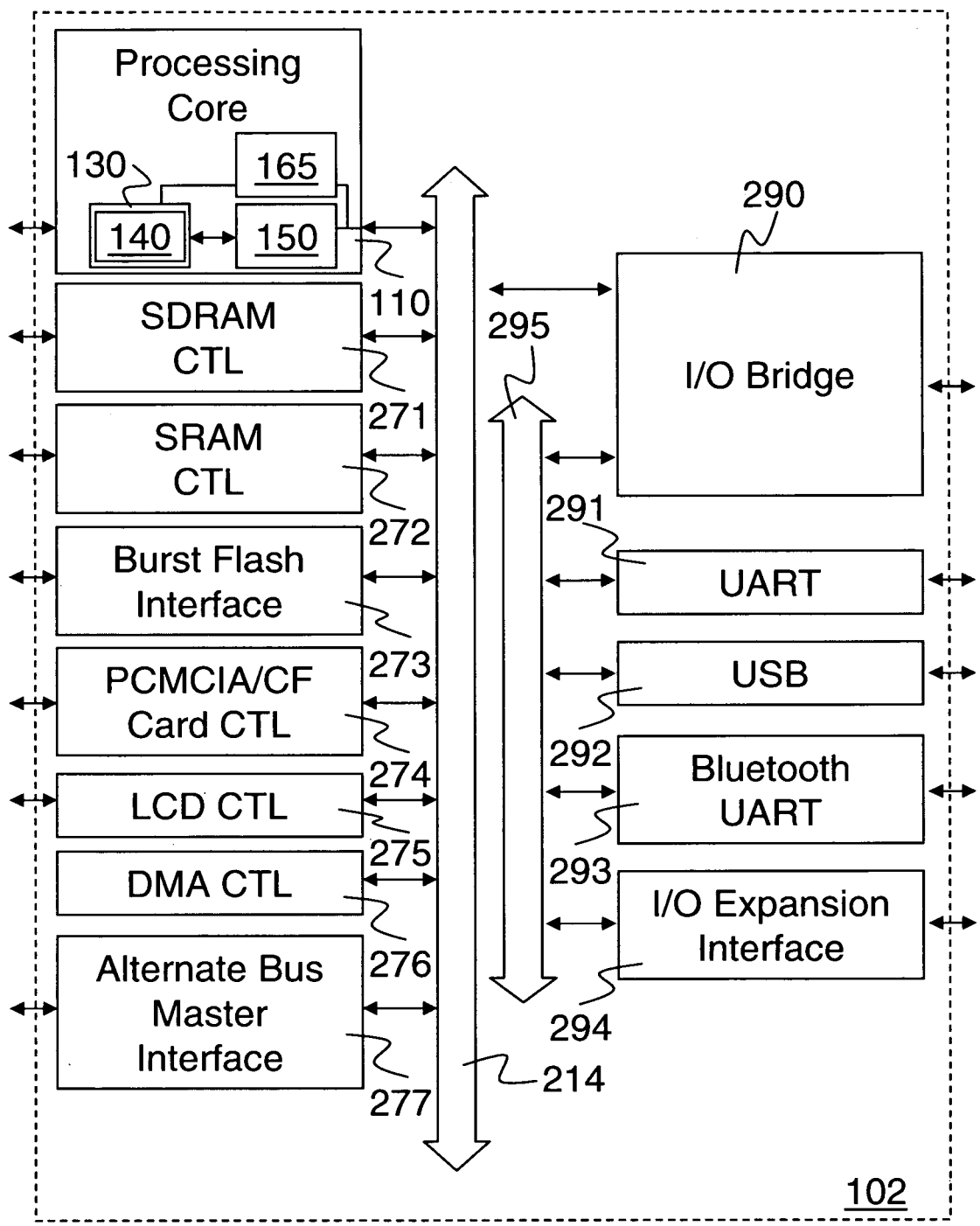

FIG. 1b illustrates an alternative embodiment of a data processing system 102 which implements the principles of the present invention. One embodiment of data processing system 102 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 102 comprises a processing core 110 capable of performing SIMD operations including multiply-add and/subtract operations, pack and unpack operations, shuffle operations, packed shift operations, and packed arithmetic and logical operations. For one embodiment, processing core 110 represents a processing unit of any type of architecture, including but not limited to a CISC, a RISC or a VLIW type architecture. Processing core 110 may also be suitable for manufacture in one or more process technologies and by being represented on a machine readable media in sufficient detail, may be suitable to facilitate said manufacture.

Processing core 110 comprises an execution unit 130, a set of register file(s) 150, and a decoder 165. Processing core 110 also includes additional circuitry (not shown) which is not necessary to the understanding of the present invention.

Execution unit 130 is used for executing instructions received by processing core 110. In addition to recognizing typical processor instructions, execution unit 220 recognizes instructions in packed instruction set 140 for performing operations on packed data formats. Packed instruction set 140 includes instructions for supporting multiply-add/subtract operations and shuffle operations, and may also include other packed instructions.

Execution unit 130 is coupled to register file 150 by an internal bus. Register file 150 represents a storage area on processing core 110 for storing information, including data. As previously mentioned, it is understood that the storage area used for storing the packed data is not critical. Execution unit 130 is coupled to decoder 165. Decoder 165 is used for decoding instructions received by processing core 110 into control signals and/or microcode entry points. In response to these control signals and/or microcode entry points, execution unit 130 performs the appropriate operations.

Processing core 110 is coupled with bus 214 for communicating with various other system devices, which may include but are not limited to, for example, synchronous dynamic random access memory (SDRAM) control 271, static random access memory (SRAM) control 272, burst flash memory interface 273, personal computer memory card international association (PCMCIA)/compact flash (CF) card control 274, liquid crystal display (LCD) control 275, direct memory access (DMA) controller 276, and alternative bus master interface 277.

In one embodiment, data processing system 102 may also comprise an I/O bridge 290 for communicating with various I/O devices via an I/O bus 295. Such I/O devices may include but are not limited to, for example, universal asynchronous receiver/transmitter (UART) 291, universal serial bus (USB) 292, Bluetooth wireless UART 293 and I/O expansion interface 294.

One embodiment of data processing system 102 provides for mobile, network and/or wireless communications and a processing core 110 capable of performing SIMD operations including multiply add and/or subtract operations, pack and unpack operations, shuffle operations, packed shift operations, and packed arithmetic and logical operations. Processing core 110 may be programmed with various audio, video, imaging and communications algorithms including transformations, filters or convolutions; compression/decompression techniques such as color space transformation, bilinear interpolation, video encode motion estimation or video decode motion compensation; and modulation/demodulation (MODEM) functions such as pulse coded modulation (PCM).

Figure 1C:
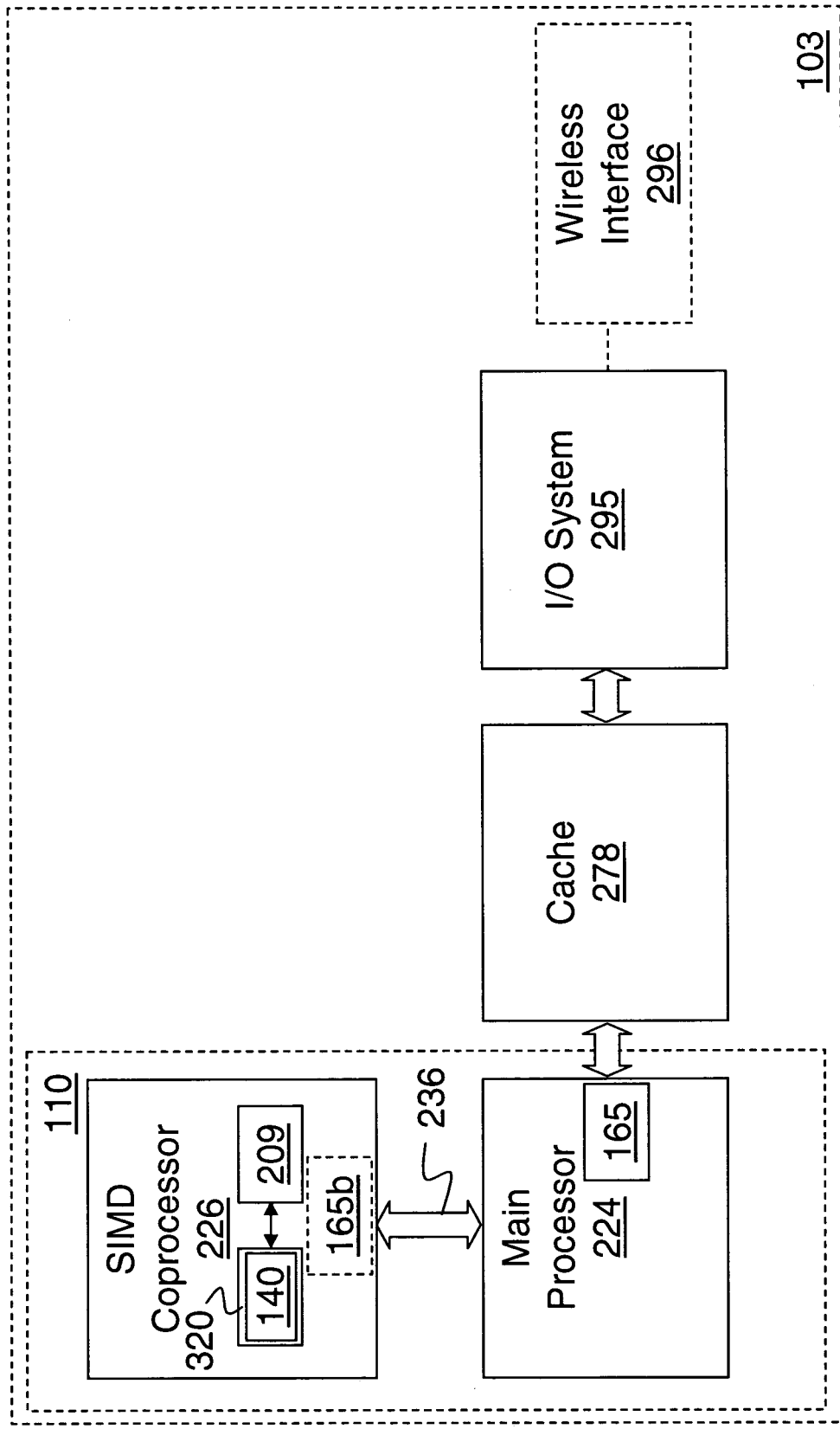

FIG. 1c illustrates alternative embodiments of a data processing system 103 capable of performing SIMD multiply-add/subtract operations and shuffle operations. In accordance with one alternative embodiment, data processing system 103 may include a main processor 224, a SIMD coprocessor 226, a cache memory 278 and an input/output system 265. The input/output system 295 may optionally be coupled to a wireless interface 296. SIMD coprocessor 226 is capable of performing SIMD operations including multiply-add/subtract operations, pack and unpack operations, shuffle operations, packed shift operations, and packed arithmetic and logical operations. Processing core 110 may be suitable for manufacture in one or more process technologies and by being represented on a machine readable media in sufficient detail, may be suitable to facilitate the manufacture of all or part of data processing system 103 including processing core 110.

For one embodiment, SIMD coprocessor 226 comprises an execution unit 130 and register file(s) 209. One embodiment of main processor 224 comprises a decoder 165 to recognize instructions of instruction set 140 including SIMD multiply-add/subtract instructions, pack and unpack instructions, shuffle instructions, packed shift instructions, and packed arithmetic and logical instructions for execution by execution unit 130. For alternative embodiments, SIMD coprocessor 226 also comprises at least part of decoder 165b to decode instructions of instruction set 140. Processing core 110 also includes additional circuitry (not shown) which is not necessary to the understanding of the present invention.

In operation, the main processor 224 executes a stream of data processing instructions that control data processing operations of a general type including interactions with the cache memory 278, and the input/output system 295. Embedded within the stream of data processing instructions are SIMD coprocessor instructions. The decoder 165 of main processor 224 recognizes these SIMD coprocessor instructions as being of a type that should be executed by an attached SIMD coprocessor 226. Accordingly, the main processor 224 issues these SIMD coprocessor instructions (or control signals representing SIMD coprocessor instructions) on the coprocessor bus 236 where from they are received by any attached SIMD coprocessors. In this case, the SIMD coprocessor 226 will accept and execute any received SIMD coprocessor instructions intended for it.

Data may be received via wireless interface 296 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames.

For one embodiment of processing core 110, main processor 224 and a SIMD coprocessor 226 are integrated into a single processing core 110 comprising an execution unit 130, register file(s) 209, and a decoder 165 to recognize instructions of instruction set 140 including SIMD multiply-add/subtract instructions, pack and unpack instructions, shuffle instructions, packed shift instructions, and packed arithmetic and logical instructions for execution by execution unit 130.

Figure 2A:
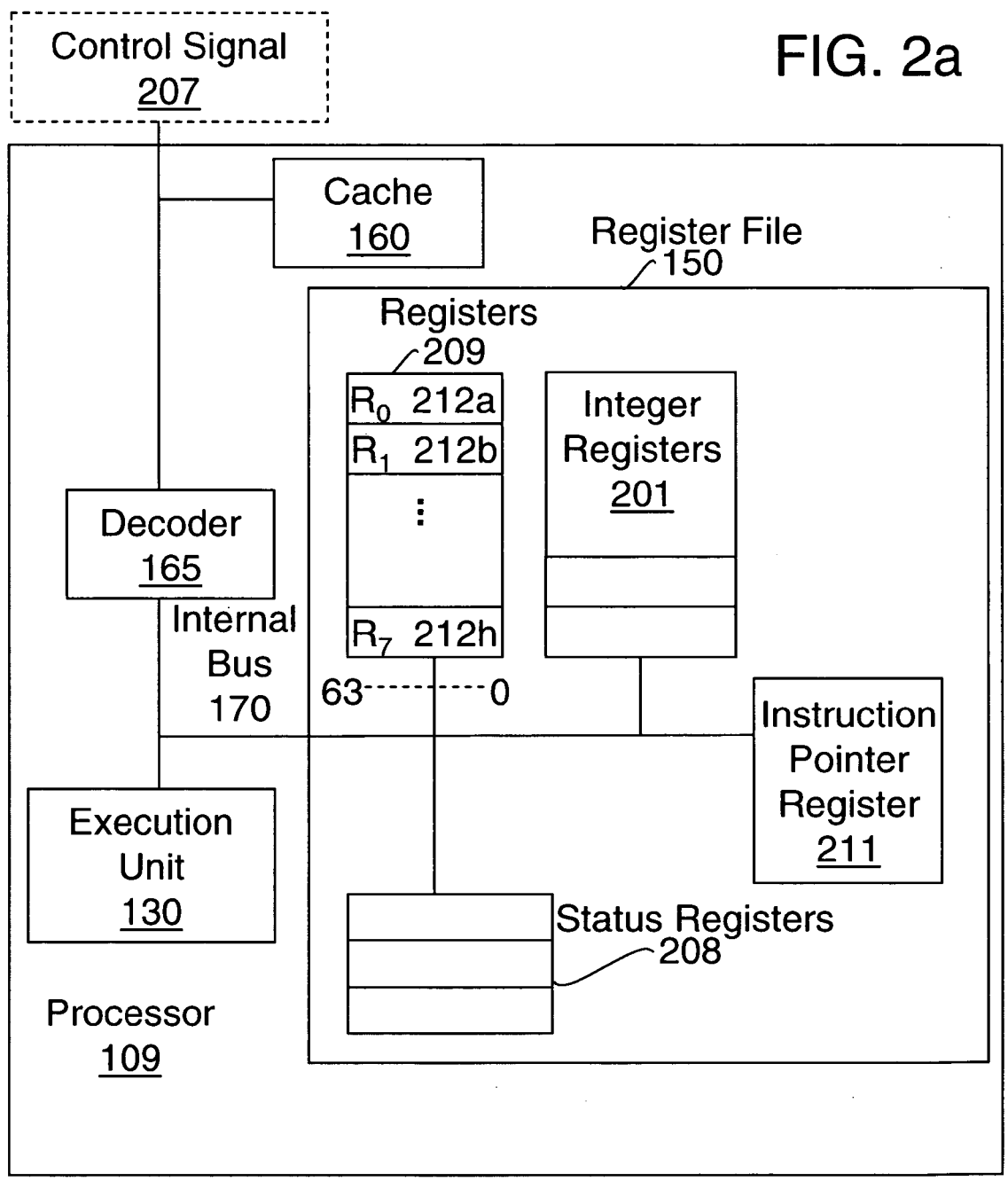
FIGS. 2a-2b illustrate register files of processors according to various alternative embodiments of the invention.

FIG. 2a illustrates the register file of the processor according to one embodiment of the invention. The register file 150 may be used for storing information, including control/status information, integer data, floating point data, and packed data. In the embodiment shown in FIG. 2a, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Additional registers may also be coupled to internal bus 170.

In one embodiment, the registers 209 are used for both packed data and floating point data. In one such embodiment, the processor 109, at any given time, must treat the registers 209 as being either stack referenced floating point registers or non-stack referenced packed data registers. In this embodiment, a mechanism is included to allow the processor 109 to switch between operating on registers 209 as stack referenced floating point registers and non-stack referenced packed data registers. In another such embodiment, the processor 109 may simultaneously operate on registers 209 as non-stack referenced floating point and packed data registers. As another example, in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212h. $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209. In another alternative embodiment, the registers 209 each contain 64 bits and registers 209 contains sixteen registers. In yet another alternative embodiment, registers 209 contains thirty-two registers.

Figure 2B:
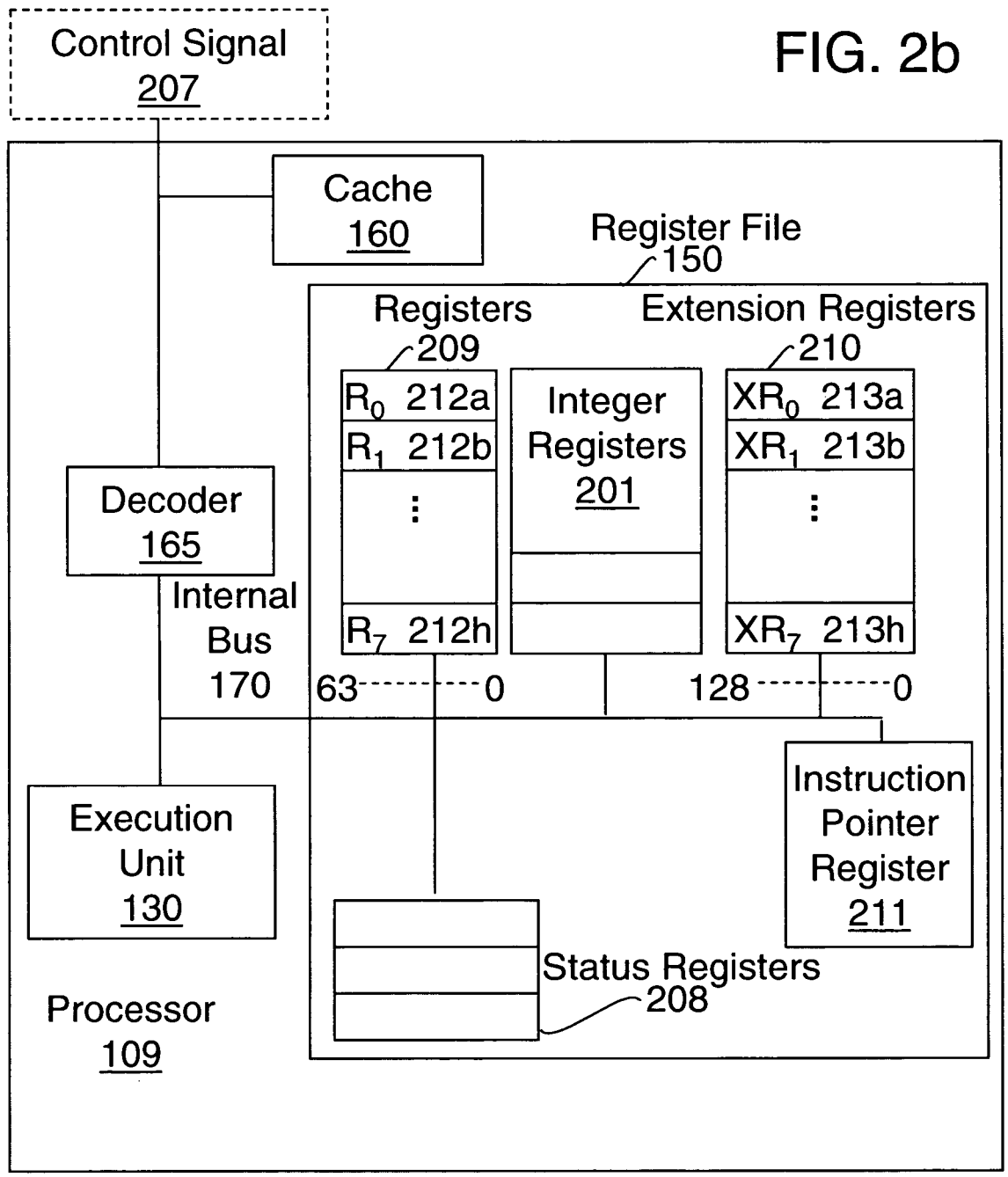

FIG. 2b illustrates the register file of the processor according to one alternative embodiment of the invention. The register file 150 may be used for storing information, including control/status information, integer data, floating point data, and packed data. In the embodiment shown in FIG. 2b, the register file 150 includes integer registers 201, registers 209, status registers 208, extension registers 210, and instruction pointer register 211. Status registers 208, instruction pointer register 211, integer registers 201, registers 209, are all coupled to internal bus 170. Additionally, extension registers 210 are also coupled to internal bus 170.

In one embodiment, the extension registers 210 are used for both packed integer data and packed floating point data. In alternative embodiments, the extension registers 210 may be used for scalar data, packed Boolean data, packed integer data and/or packed floating point data. Of course, alternative embodiments may be implemented to contain more or less sets of registers, more or less registers in each set or more or less data in each register without departing from the broader scope of the invention.

In one embodiment, the integer registers 201 are implemented to store thirty-two bits, the registers 209 are implemented to store eighty bits (all eighty bits are used for storing floating point data, while only sixty-four are used for packed data) and the extension registers 210 are implemented to store 128 bits. In addition, extension registers 210 may contain eight registers, $XR_0$ 213a through $XR_7$ 213h. $XR_1$ 213a, $XR_2$ 213b and $R_3$ 213c are examples of individual registers in registers 210. In another embodiment, the integer registers 201 each contain 64 bits, the registers 210 each contain 64 bits and registers 210 contains sixteen registers. In one embodiment two registers of registers 210 may be operated upon as a pair. In yet another alternative embodiment, registers 210 contains thirty-two registers.

Figure 3:
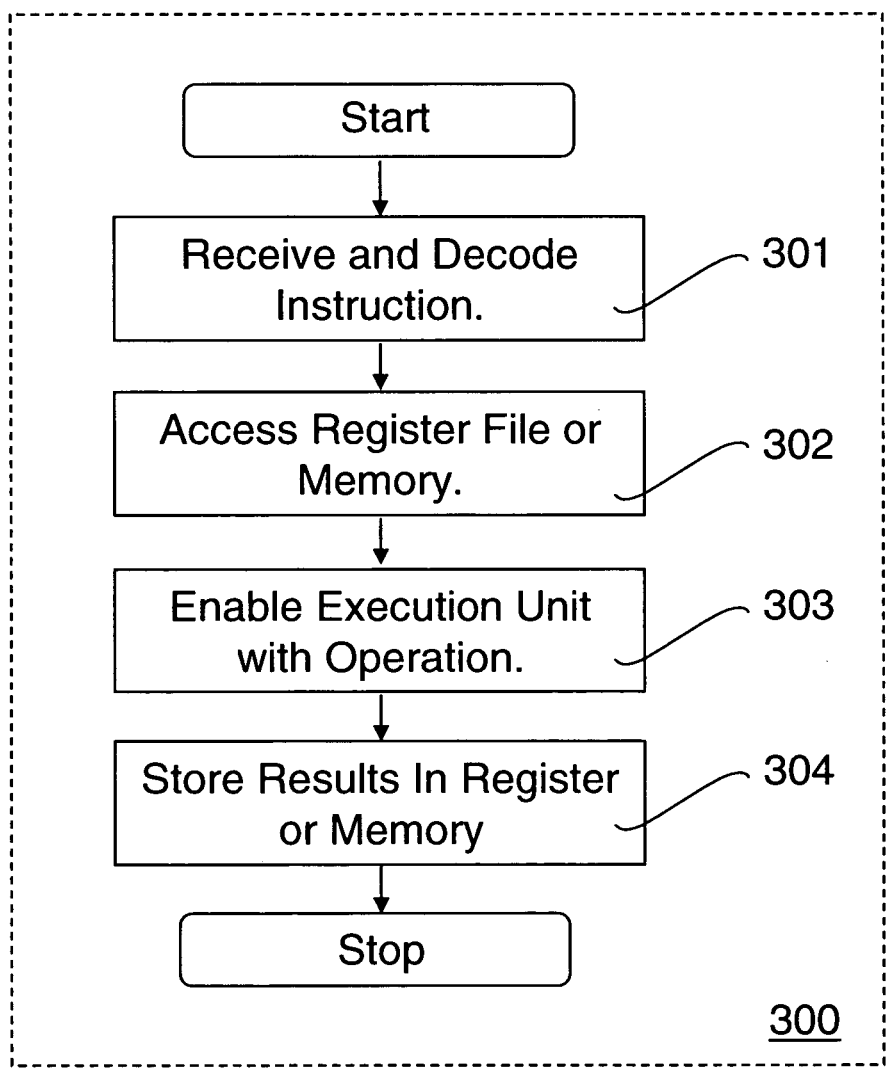
FIG. 3 illustrates a flow diagram for one embodiment of a process used by the processor to manipulate data.

FIG. 3 illustrates a flow diagram for one embodiment of a process 300 to manipulate data according to one embodiment of the invention. That is, FIG. 3 illustrates a process followed, for example, by processor 109 while performing an operation on packed data, performing an operation on unpacked data, or performing some other operation. Process 300 and other processes herein disclosed are performed by processing blocks that may comprise dedicated hardware or software or firmware operation codes executable by general purpose machines or by special purpose machines or by a combination of both.

In processing block 301, the decoder 165 receives a control signal from either the cache 160 or bus 101. Decoder 165 decodes the control signal to determine the operations to be performed.

In processing block 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIGS. 6a-6d. The data stored in the corresponding registers is referred to as Source1, Source2, and Result respectively. In one embodiment, each of these data may be sixty-four bits in length. In an alternative embodiment, these data may be sixty-four or one hundred twenty-eight bits in length.

In another embodiment of the invention, any one, or all, of SRC1, SRC2 and DEST, can define a memory location in the addressable memory space of processor 109 or processing core 110. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

In processing block 303, execution unit 130 is enabled to perform the operation on the accessed data. In processing block 304, the result is stored back into register file 150 according to requirements of the control signal.

Data Storage Formats

FIG. 4a illustrates packed data-types according to one embodiment of the invention. Three packed data formats are illustrated; packed byte 411, packed word 412, and packed doubleword 413. Packed byte, in one embodiment of the invention, is sixty-four bits long containing eight data elements. In an alternative embodiment, packed byte may be sixty-four or one hundred twenty-eight bits long containing eight or sixteen data elements. Each data element is one byte long. Generally, a data element is an individual piece of data that is stored in a single register (or memory location) with other data elements of the same length. In one embodiment of the invention, the number of data elements stored in a register is sixty-four bits or one hundred twenty-eight bits divided by the length in bits of a data element.

Packed word 412 may be sixty-four or one hundred twenty-eight bits long and contains four or eight word 412 data elements. Each word 412 data element contains sixteen bits of information.

Packed doubleword 413 may be sixty-four or one hundred twenty-eight bits long and contains two or four doubleword 413 data elements. Each doubleword 413 data element contains thirty-two bits of information.

FIG. 4a also illustrates a quadword 414 data-type according to one embodiment of the invention. Each quadword 414 data element contains sixty-four bits of information.

FIG. 4b illustrates packed data-types according to one alternative embodiment of the invention. Four packed data formats are illustrated; packed byte 421, packed half 422, packed single 423 and packed double 424. Packed byte, in one embodiment of the invention, is one hundred twenty-eight bits long containing sixteen data elements. In an alternative embodiment, packed byte may be sixty-four or one hundred twenty-eight bits long containing eight or sixteen data elements. Each data element is one byte long.

Packed half 422 may be sixty-four or one hundred twenty-eight bits long and contains four or eight half 422 data elements. Each half 422 data element contains sixteen bits of information.

Packed single 423 may be sixty-four or one hundred twenty-eight bits long and contains two or four single 423 data elements. Each single 423 data element contains thirty-two bits of information.

Packed double 424 may be sixty-four or one hundred twenty-eight bits long and contains one or two double 424 data elements. Each double 424 data element contains sixty-four bits of information.

In one embodiment of the invention, packed single 423 and packed double 424 may be packed floating point data elements. In an alternative embodiment of the invention, packed single 423 and packed double 424 may be packed integer, packed Boolean or packed floating point data elements. In another alternative embodiment of the invention, packed byte 421, packed half 422, packed single 423 and packed double 424 may be packed integer or packed Boolean data elements. In alternative embodiments of the invention, not all of the packed byte 421, packed half 422, packed single 423 and packed double 424 data formats may be permitted.

FIGS. 5a-5d illustrate the in-register packed data storage representation according to one embodiment of the invention. Unsigned packed byte in-register representation 510 illustrates the storage of an unsigned packed byte, for example in one of the registers $R_0$ 212a through $R_7$ 212h or in half of one of the registers $XR_0$ 213a through $XR_7$ 213h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte. Note that the eighth bit of every byte data element is the sign indicator.

Unsigned packed word in-register representation 512 illustrates how word three through word zero are stored in one register of registers 209 or in half of a register of registers 210. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 or registers 210, for example, store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

Unsigned packed quadword in-register representation 516 shows how registers 210 store two quadword data elements. Quadword zero is stored in bit sixty-three through bit zero of the register. Quadword one is stored in bit one hundred twenty-seven through bit sixty-four of the register. Signed packed quadword in-register representation 517 is similar to unsigned packed quadword in-register representation 516. Note that the necessary sign bit is the sixty-fourth bit of the quadword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

Operation Encoding Formats

Figure 6A:
FIGS. 6a-6d illustrate operation encoding (opcode) formats for indicating the use of packed data according to various alternative embodiments of the invention.

Turning next to FIG. 6a, in some alternative embodiments, 64 bit single instruction multiple data (SIMD) arithmetic operations may be performed through a coprocessor data processing (CDP) instruction. Operation encoding (opcode) format 601 depicts one such CDP instruction having CDP opcode fields 611 and 618. The type of CDP instruction, for alternative embodiments of multiply-add/subtract operations, pack and unpack operations, shuffle operations, packed shift operations, and packed arithmetic and logical operations may be encoded by one or more of fields 612, 613, 616 and 617. Up to three operand locations per instruction may be identified, including up to two source operand identifiers SRC1 602 and SRC2 603 and one destination operand identifier DEST 605. One embodiment of the coprocessor can operate on 8, 16, 32, and 64 bit values. For one embodiment, the multiply-addition/subtraction is performed on fixed-point or integer data values. For alternative embodiments, multiply-addition/subtraction may be performed on floating-point data values. In some embodiments, the multiply-add/subtract instructions, shuffle instructions and other SIMD instructions may be executed conditionally, using condition field 610. For some multiply-add/subtract instructions and/or other SIMD instructions, source data sizes may be encoded by field 612.

In some embodiments of the multiply-add/subtract instructions, Zero (Z), negative (N), carry (C), and overflow (V)

detection can be done on SIMD fields. Also, signed saturation and/or unsigned saturation to the SIMD field width may be performed for some embodiments of multiply-add/subtract operations. In some embodiments of the multiply-add/subtract instructions in which saturation is enabled, saturation detection may also be done on SIMD fields. For some instructions, the type of saturation may be encoded by field 613. For other instructions, the type of saturation may be fixed.

Figure 6B:

FIG. 6b is a depiction of an alternative operation encoding (opcode) format 621, having twenty-four or more bits, and register/memory operand addressing modes corresponding with a type of opcode format described in the "IA-32 Intel Architecture Software Developer's Manual Volume 2: Instruction Set Reference," (Order number 245471) which is available from Intel Corporation, Santa Clara, Calif. on the world-wide-web (www) at developer.intel.com. The type of operation, may be encoded by one or more of fields 622 and 624. Up to two operand locations per instruction may be identified, including up to two source operand identifiers SRC1 602 and SRC2 603. For one embodiment of the multiply-add/subtract instruction and the shuffle instruction, destination operand identifier DEST 605 is the same as source operand identifier SRC1 602. For an alternative embodiment, destination operand identifier DEST 605 is the same as source operand identifier SRC2 603. Therefore, for embodiments of the multiply-add/subtract operations and/or the shuffle operations, one of the source operands identified by source operand identifiers SRC1 602 and SRC2 603 is overwritten by the results of the multiply-add/subtract operations or the shuffle operations. For one embodiment of the multiply-add/subtract instruction and/or the shuffle instruction, operand identifiers SRC1 602 and SRC2 603 may be used to identify 64-bit source and destination operands.

Figure 6C:

FIG. 6c is a depiction of an alternative operation encoding (opcode) format 631, having thirty-two or more bits, and register/memory operand addressing modes. The type of operation, may be encoded by one or more of fields 632 and 634 and up to two operand locations per instruction may be identified, including up to two source operand identifiers SRC1 602 and SRC2 603. For example, in one embodiment of the multiply-add instruction, field 632 may be set to a hexadecimal value of 0F38 and field 634 may be set to a hexadecimal value of 04 to indicate that data associated with source operand identifier SRC1 602 is to be treated as unsigned packed bytes, data associated with source operand identifier SRC2 603 is to be treated as signed packed bytes and result data associated with destination operand identifier DEST 605 is to be treated as signed packed words. In one embodiment of the shuffle instruction, field 632 may be set to a hexadecimal value of 0F38 and field 634 may be set to a hexadecimal value of 00 to indicate that byte data is associated with source operand identifier SRC1 602 is to be reordered according to byte fields associated with source operand identifier SRC2 603 and stored as packed byte data associated with destination operand identifier DEST 605.

For one embodiment, destination operand identifier DEST 605 is the same as source operand identifier SRC1 602. For an alternative embodiment, destination operand identifier DEST 605 is the same as source operand identifier SRC2 603. For one embodiment of the multiply-add/subtract instruction and/or the shuffle instruction, operand identifiers SRC1 602 and SRC2 603 of opcode format 631 may be used to identify 64-bit source and destination operands. For an alternative embodiment of the multiply-add/subtract instruction and/or the shuffle instruction, operand identifiers SRC1 602 and SRC2 603 may be used to identify 128-bit source and destination operands.

For one embodiment, opcode format 621, opcode format 631 and other opcode formats described in the "IA-32 Intel Architecture Software Developer's Manual Volume 2: Instruction Set Reference," (available from Intel Corporation, Santa Clara, Calif. on the world-wide-web at developer.intel.com) are each supported by decoder 165. In alternative embodiments of decoder 165, a plurality of instructions, each potentially having a different opcode format, may be decoded concurrently or in parallel. It will be appreciated that the decoding of opcode formats in a timely manner may be of critical importance to the performance of a processor such as processor 109. One of the unique requirements of decoding multiple opcode formats of variable lengths is determining precisely where each instruction begins. In order to accomplish this requirement, the lengths of each of the plurality of opcode formats must be determined.

For example, in one embodiment of opcode format 621, determining the length of an instruction requires examination of up to 27 bits from fields 622, 624, 626, 602, 603 and potentially from a 3-bit base field of an optional scale-index-base (SIB) byte (not shown), which is described in the "IA-32 Intel Architecture Software Developer's Manual Volume 2: Instruction Set Reference." It will be appreciated that, if determining the length of an instruction using opcode format 631 requires examination of more bits than determining the length of an instruction using opcode format 621, additional complexity and/or delays may be incurred.

For one embodiment of the multiply-add instruction and/or the shuffle instruction, field 632 may be set to a hexadecimal value of 0F38, which may be used in a manner substantially similar to that of fields 622 in determining the length of an instruction. Further, when field 632 is set to the hexadecimal value of 0F38, field 634 may be ignored by decoder 165 in determining the length of the instruction, thereby requiring examination of no more than 27 bits from fields 632, 626, 602, 603 and potentially from the 3-bit base field of an optional SIB byte. Thus opcode format 631 may be implemented in such a way as to provide additional flexibility and diversity of instruction encodings and avoid introduction of unnecessary complexity and/or delays in decoder 165.

Figure 6D:

FIG. 6d is a depiction of another alternative operation encoding (opcode) format 641, having forty or more bits. Opcode format 641 corresponds with opcode format 631 and comprises an optional prefix byte 640. The type of multiply-add/subtract operation and/or shuffle operation, may be encoded by one or more of fields 640, 632 and 634. Up to two operand locations per instruction may be identified by source operand identifiers SRC1 602 and SRC2 603 and by prefix byte 640. For one embodiment of the multiply-add/subtract instruction and/or the shuffle instruction, prefix byte 640 may be used to identify 128-bit source and destination operands. For example, in one embodiment of the multiply-add instruction and/or the shuffle instruction, prefix byte 640 may be set to a hexadecimal value of 66, to indicate that 128 bits of data from one of the extension registers 210 are associated with source operand identifiers SRC1 602 and SRC2 603 and 128 bits of result data from one of the extension registers 210 are associated with destination operand identifier DEST 605.

For one embodiment of the multiply-add/subtract instruction and/or the shuffle instruction, destination operand identifier DEST 605 is the same as source operand identifier SRC1 602. For an alternative embodiment, destination operand identifier DEST 605 is the same as source operand identifier SRC2 603. Therefore, for embodiments of the multiply-add/subtract operations and/or the shuffle operations, one of the source operands identified by source operand identifiers SRC1 602 and SRC2 603 of opcode format 631 or opcode format 641 is overwritten by the results of the multiply-add/subtract operations or of the shuffle operations.

Opcode formats 621, 631 and 641 allow register to register, memory to register, register by memory, register by register, register by immediate, register to memory addressing specified in part by MOD fields 626 and by optional scale-index-base and displacement bytes.

Description of Saturate/Unsaturate

As mentioned previously, in some embodiments multiply-add/subtract opcodes may indicate whether operations optionally saturate. In some alternative embodiments saturation may not be optional for a given multiply-add/subtract instruction. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable ranges for data formats is shown in Table 5.

TABLE 5

| Data Format | Minimum Value | Maximum Value |
|---|---|---|
| Unsigned Byte | 0 | 255 |
| Signed Byte | −128 | 127 |
| Unsigned word | 0 | 65535 |
| Signed word | −32768 | 32767 |
| Unsigned Doubleword | 0 | $2^{32} - 1$ |
| Signed Doubleword | $-2^{31}$ | $2^{31} - 1$ |
| Unsigned Quadword | 0 | $2^{64} - 1$ |
| Signed Quadword | $-2^{63}$ | $2^{63} - 1$ |

Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Multiply-Add/Subtract Operation(S)

In one embodiment of the invention, the SRC1 register contains packed data (Source1), the SRC2 register contains packed data (Source2), and the DEST register will contain the result (Result) of performing the multiply-add or multiply-subtract instruction on Source1 and Source2. In the first step of the multiply-add and multiply-subtract instruction, Source1 will have each data element independently multiplied by the respective data element of Source2 to generate a set of respective intermediate results. These intermediate results are summed by pairs to generate the Result for the multiply-add instruction. In contrast, these intermediate results are subtracted by pairs to generate the Result for the multiply-subtract instruction.

In some current processors, the multiply-add instructions operate on signed packed data and truncate the results to avoid any overflows. In addition, these instructions operate on packed word data and the Result is a packed double word. However, alternative embodiments of the multiply-add or the multiply-subtract instructions support other packed data types. For example, one embodiment may support the multiply-add or the multiply-subtract instructions on packed byte data wherein the Result is a packed word.

Figure 7A:
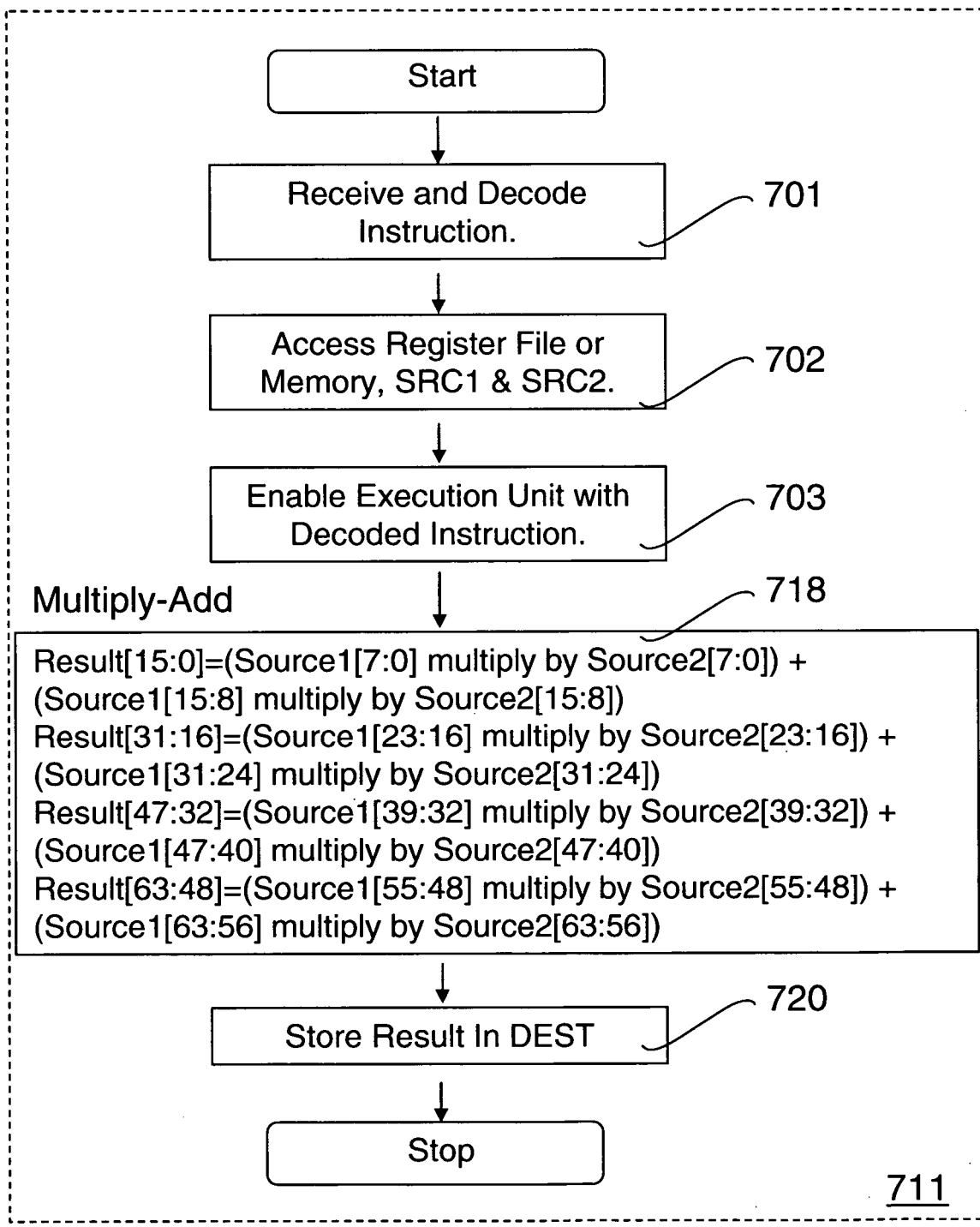
FIGS. 7a-7b illustrate flow diagrams for various alternative embodiments of processes for performing multiply-add and multiply-subtract operations on packed byte data.

FIG. 7a illustrates a flow diagram for alternative embodiments of a process 711 for a performing multiply-add operation on packed byte data. Process 711 and other processes herein disclosed are performed by processing blocks that may comprise dedicated hardware or software or firmware operation codes executable by general purpose machines or by special purpose machines or by a combination of both.

In processing block 701, decoder 165 decodes the control signal received by processor 109. Thus, decoder 165 decodes the operation code for a multiply-add instruction. It will be appreciated that while examples are given of multiply-add, one of skill in the art could modify the teachings of this disclosure to also perform multiply-subtract without departing from the broader spirit of the invention as set forth in the accompanying claims.

In processing block 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 (or extension registers 210) communicate the packed data to execution unit 130 via internal bus 170. As noted above, Source1 data and Source2 data may be accessed from memory as well as from registers 209 (or extension registers 210) and the term "register" as used in these examples is not intended to limit the access to any particular kind of storage device. Rather, various embodiments, for example opcode formats 621, 631 and 641, allow register to register, memory to register, register by memory, register by register, register by immediate, register to memory addressing. Therefore, a register of an embodiment need only be capable of storing and providing data, and performing the functions described herein.

In processing block 703, decoder 165 enables execution unit 130 to perform the instruction. If the instruction is a multiply-add instruction for processing byte data, flow passes to processing block 718.

In processing block 718, the following is performed. Source1 bits seven through zero are multiplied by Source2 bits seven through zero generating a first 16-bit intermediate result (Intermediate Result 1). Source1 bits fifteen through eight are multiplied by Source2 bits fifteen through eight generating a second 16-bit intermediate result (Intermediate Result 2). Source1 bits twenty-three through sixteen are multiplied by Source2 bits twenty-three through sixteen generating a third 16-bit intermediate result (Intermediate Result 3). Source1 bits thirty-one through twenty-four are multiplied by Source2 bits thirty-one through twenty-four generating a fourth 16-bit intermediate result (Intermediate Result 4). Source1 bits thirty-nine through thirty-two are multiplied by Source2 bits thirty-nine through thirty-two generating a fifth 16-bit intermediate result (Intermediate Result 5). Source1 bits forty-seven through forty are multiplied by Source2 bits forty-seven through forty generating a sixth 16-bit intermediate result (Intermediate Result 6). Source1 bits fifty-five through forty-eight are multiplied by Source2 bits fifty-five through forty-eight generating a seventh 16-bit intermediate result (Intermediate Result 7). Source1 bits sixty-three through fifty-six are multiplied by Source2 bits sixty-three through fifty-six generating an eighth 16-bit intermediate result (Intermediate Result 8). Intermediate Result 1 is added to Intermediate Result 2 generating Result bits fifteen through zero, Intermediate Result 3 is added to Intermediate Result 4 generating Result bits thirty-one through sixteen, Intermediate Result 5 is added to Intermediate Result 6 generating Result bits forty-seven through thirty-two, and Intermediate Result 7 is added to Intermediate Result 8 generating Result bits sixty-three through forty-eight.

Processing of a multiply-subtract instruction on byte data is substantially the same as processing block 718, with the exception that Intermediate Result 1 and Intermediate Result 2 are subtracted to generate Result bits fifteen through zero, Intermediate Result 3 and Intermediate Result 4 are subtracted to generate Result bits thirty-one through sixteen, Intermediate Result 5 and Intermediate Result 6 are subtracted to generate Result bits forty-seven through thirty-two, and Intermediate Result 7 and Intermediate Result 8 are subtracted to generate Result bits sixty-three through forty-eight. Different embodiments may perform the multiplies and adds/subtracts serially, in parallel, or in some combination of serial and parallel operations.

In processing block 720, the Result is stored in the DEST register.

In one embodiment of processing block 718, byte elements of Source1 are treated as unsigned values and byte elements of Source2 are treated as signed values during multiplication. In another embodiment of processing block 718, Intermediate Results 1-8 are added/subtracted using signed saturation. It will be appreciated that alternative embodiments of process 711 may implement additional processing blocks to support additional variations of the multiply-add or multiply-subtract instructions.

Figure 7B:
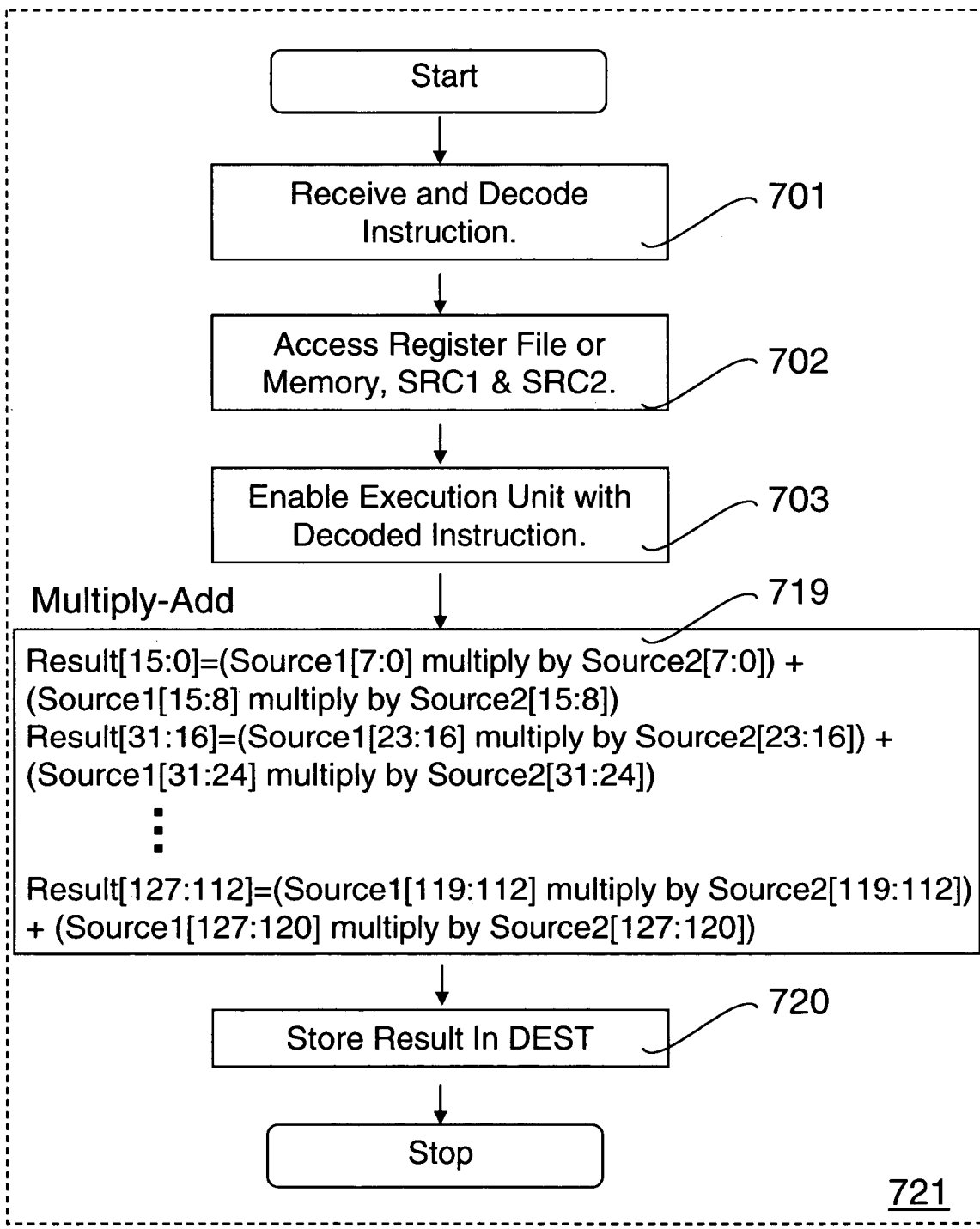

FIG. 7b illustrates a flow diagram for an alternative embodiment of a process 721 for performing multiply-add operation on packed data. Processing blocks 701 through 703 are essentially the same as in process block 711, with the exception that in processing block 703, the instruction is a multiply-add instruction for performing byte multiplications on 128-bit packed data, and so flow passes to processing block 719.

In processing block 719, the multiplication operations are substantially the same as processing block 718, with the exception that in similarity to Source1 bits seven through zero being multiplied by Source2 bits seven through zero to generate a first 16-bit intermediate result (Intermediate Result 1) and so forth through Source1 bits sixty-three through fifty-six being multiplied by Source2 bits sixty-three through fifty-six to generate an eighth 16-bit intermediate result (Intermediate Result 8), Source1 bits seventy-one through sixty-four are also multiplied by Source2 bits seventy-one through sixty-four to generate a ninth 16-bit intermediate result (Intermediate Result 9) and so forth through Source 1 bits one hundred twenty-seven through one hundred and twenty which are multiplied by Source2 bits one hundred twenty-seven through one hundred and twenty to generate a sixteenth 16-bit intermediate result (Intermediate Result 16). Then Intermediate Results 1 and 2 are added generating Result bits fifteen through zero, and so forth with pairs of Intermediate Results 3 and 4, Intermediate Results 5 and 6, . . . through Intermediate Results 15 and 16 which are added together respectively generating Result bits thirty-one through sixteen, Result bits forty-seven through thirty-two, . . . through Result bits one hundred and twenty-seven through one hundred and twelve.

Again, in processing block 720, the Result is stored in the DEST register.

It will be appreciated that alternative embodiments of processing blocks 718 or 719 may perform multiplication operations on signed or unsigned data elements or on a combination of both. It will also be appreciated that alternative embodiments of processing blocks 718 or 719 may perform addition and/or subtraction operations with or without saturation on signed or unsigned intermediate results or on a combination of both.

Packed Data Multiply-Add/Subtract Circuits

In one embodiment, the multiply-add and multiply-subtract instructions can execute on multiple data elements in the same number of clock cycles as a single multiply on unpacked data. To achieve execution in the same number of clock cycles, parallelism may be used. That is, registers may be simultaneously instructed to perform the multiply-add/subtract operations on the data elements. This is discussed in more detail below.

Figure 8A:
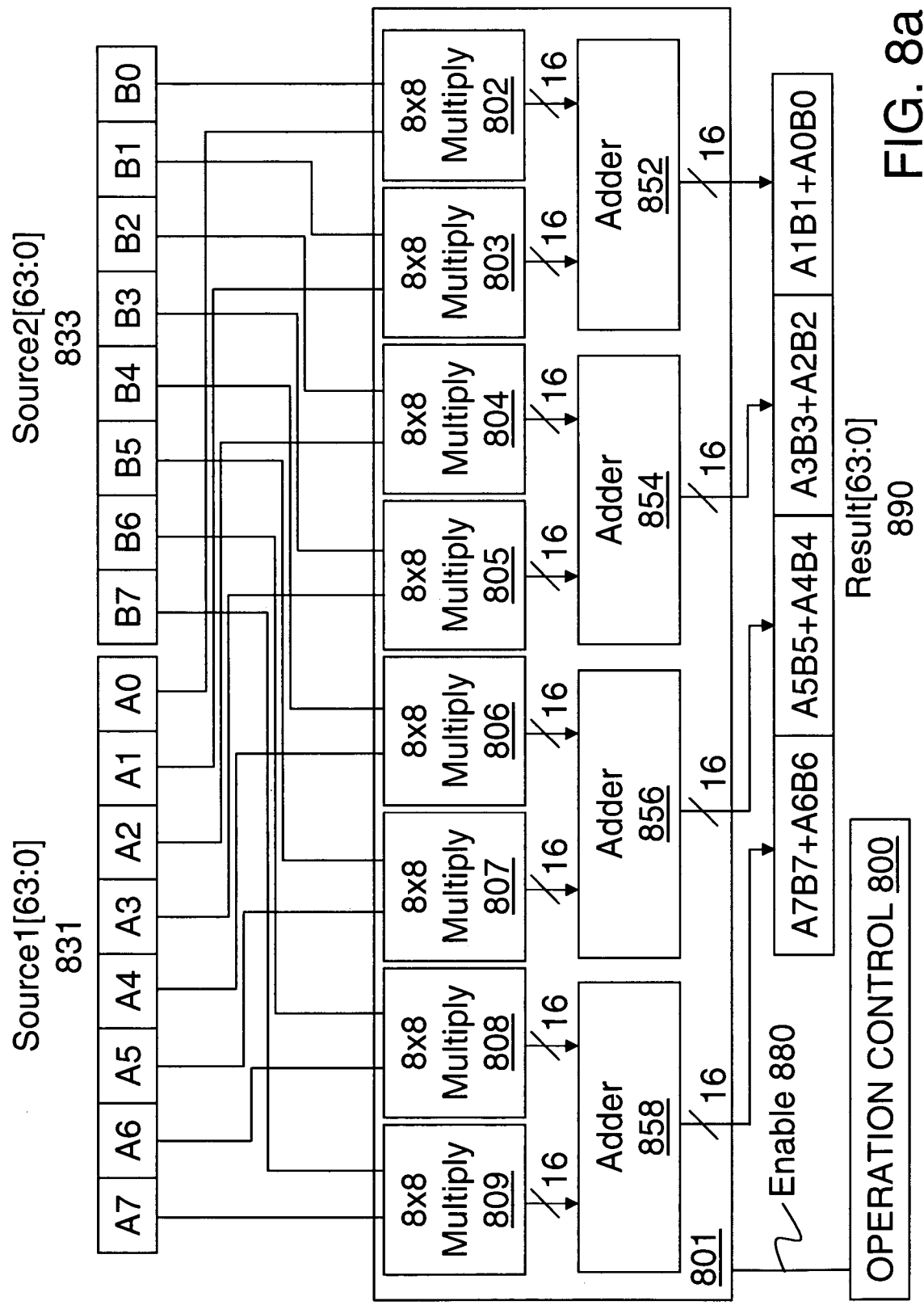
FIGS. 8a-8d illustrate alternative embodiments of circuits for performing multiply-add and multiply-subtract operations on packed data.

FIG. 8a illustrates a circuit for performing multiply-add and/or multiply-subtract operations on packed data according to one embodiment of the invention. FIG. 8a depicts a first source, Source1[63:0] 831, and a second source, Source2[63:0] 833. In one embodiment, the first and second sources are stored in N-bit long SIMD registers, such as for example 128-bit Intel® SSE2 XMM registers, or for example 64-bit MMX™ registers. For two pixel vectors 831 and 833, the multiply-add instruction implemented on such registers would give the following results, Result[63:0] 890, which are stored to the destination. Accordingly, the example shows an 8-bit byte to 16-bit word embodiment of a multiply-add instruction 142 (FIG. 1). For one alternative embodiment of the multiply-add instruction, bytes in one of the sources may be signed and in the other they may be unsigned. While in some specific examples, packed data sources and destinations may be represented as having 64-bits, it will be appreciated that the principals disclosed herein may be extended to other conveniently selected lengths, such as 80-bits, 128-bits or 256-bits.

For one alternative embodiment, a source register with unsigned data is also the destination register with the 16-bit multiply-add/subtract results. One reason for such a choice is that in many implementations, pixel data may be unsigned and coefficients may be signed. Accordingly, it may preferable to overwrite the pixel data because the pixel data is less likely to be needed in future calculations.

Operation control 800 outputs signals on Enable 880 to control operations performed by packed multiply-adder/subtracter 801. One embodiment of operation control 800 may comprise, for example, a decoder 165 and an instruction pointer register 211. Of course, operation control 800 may also comprise additional circuitry which is not necessary to understanding the invention. Packed multiply-adder/subtracter 801 includes: 8×8 multiply 802 through 8×8 multiply 809. 8×8 multiply 802 has 8-bit inputs A0 of Source1 831 and B0 of Source2 833. 8×8 multiply 803 has 8-bit inputs A1 and B1. 8×8 multiply 804 has 8-bit inputs A2 and B2. 8×8 multiply 805 has 8-bit inputs A3 and B3. 8×8 multiply 806 has 8-bit inputs A4 and B4. 8×8 multiply 807 has 8-bit inputs A5 and B5. 8×8 multiply 808 has 8-bit inputs A6 and B6. 8×8 multiply 809 has 8-bit inputs A7 and B7. The 16-bit intermediate results generated by 8×8 multiply 802 and 8×8 multiply 803 are received by adder 852, the 16-bit intermediate results generated by 8×8 multiply 804 and 8×8 multiply 805 are received by adder 854, the 16-bit intermediate results generated by 8×8 multiply 806 and 8×8 multiply 806 are received by adder 856 and the 16-bit intermediate results generated by 8×8 multiply 808 and 8×8 multiply 809 are received by adder 858.

Based on whether the current instruction is a multiply/add or multiply/subtract instruction, adder 852 through adder 858 add or subtract their respective 16-bit inputs. The output of adder 852 (i.e., bits 15 through 0 of the Result), the output of adder 854 (i.e., bits 31 through 16 of the Result), the output of adder 856 (i.e., bits 47 through 32 of the Result) and the output of adder 858 (i.e., bits 63 through 48 of the Result) are combined into a 64-bit packed result and communicated to Result[63:0] 890.

Alternative embodiments of byte multiply-add/subtract instructions may include but are not limited to operations for unsigned packed bytes in both sources and operations for signed packed bytes in both sources. Some embodiments of multiply-add/subtract instructions may saturate results while some alternative embodiments may truncate results.

Figure 8B:
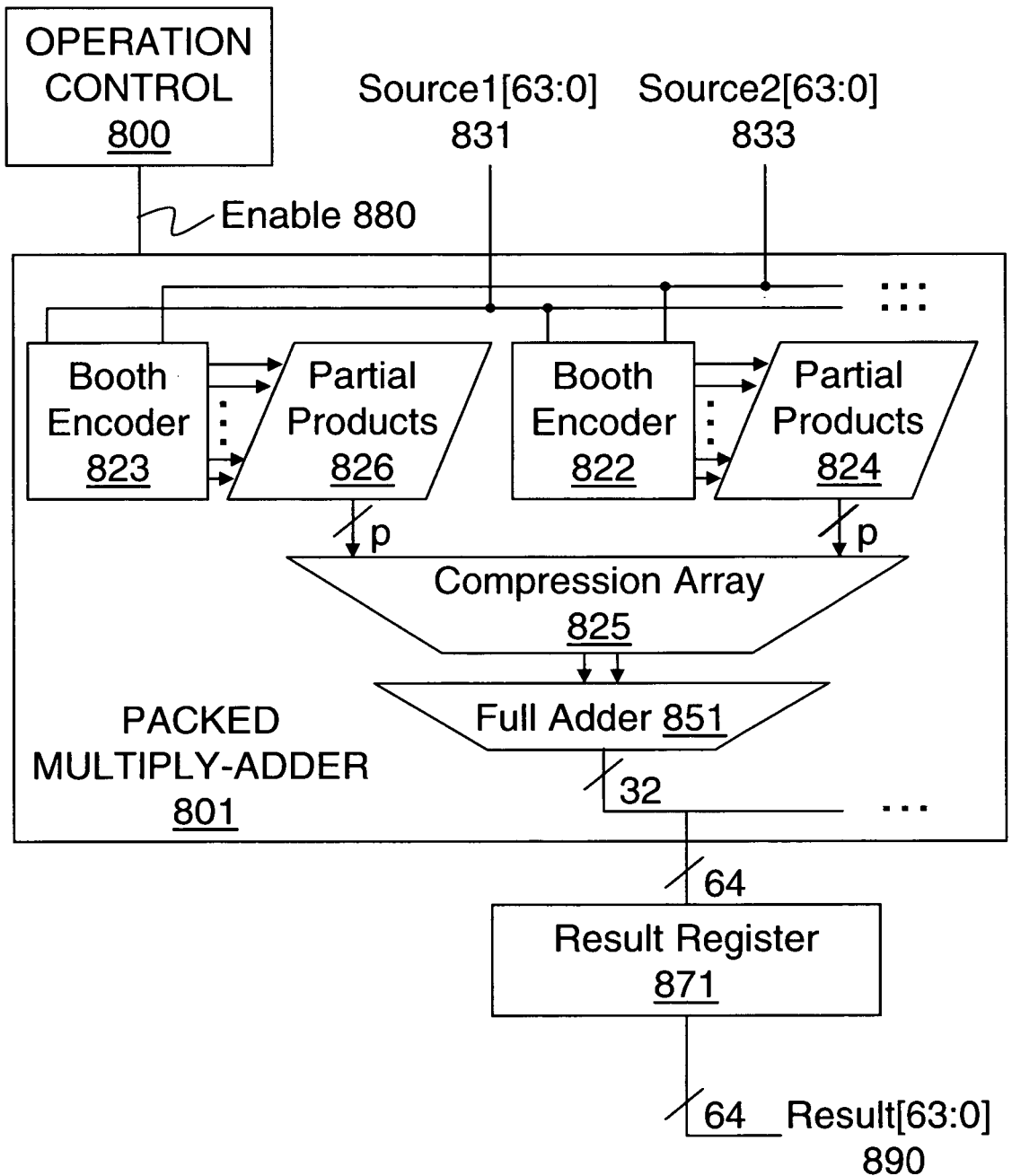

FIG. 8b illustrates a circuit for performing multiply-add and/or multiply-subtract operations on packed word data according to an alternative embodiment of the invention. Operation control 800 outputs signals on Enable 880 to control Packed multiply-adder/subtracter 801. Packed multiply-adder/subtracter 801 has inputs: Source1[63:0] 831, Source2 [63:0] 833, and Enable 880. Packed multiply-adder/subtracter 801 includes 16×16 multiplier circuits and 32-bit adders. A first 16×16 multiplier comprises booth encoder 823, which has as inputs Source1[63:48] and Source2[63:48]. Booth encoder 823 selects partial products 826 based on the values of its inputs Source 1[63:48] and Source2[63:48]. A second 16×16 multiplier comprises booth encoder 822, which has as inputs Source1[47:32] and Source2[47:32]. Booth encoder 822 selects partial products 824 based on the values of its inputs Source1[47:32] and Source2[47:32]. For example, in one embodiment of Booth encoder 822, the three bits, Source 1 [47:45], may be used to select a partial product of zero (if Source1 [47:45] are 000 or 111); Source2[47:32] (if Source1[47:45] are 001 or 010); 2 times Source2[47:32] (if Source1[47:45] are 011); negative 2 times Source2[47:32] (if Source1[47:45] are 100); or negative 1 times Source2[47:32] (if Source1[47:45] are 101 or 110). Similarly, Source1 [45:43], Source1[43:41], Source1[41:39], etc. may be used to select their respective partial products 824.

Partial products 824 and partial products 826 are provided as inputs to compression array 825, each group of partial products being aligned in accordance with the respective bits from Source1 used to generation them. For one embodiment compression array 825 may be implemented as a Wallace tree structure of carry-save adders. For alternative embodiments compression array 825 may be implemented as a sign-digit adder structure. The intermediate results from compression array 825 are received by adder 851.

Based on whether the current instruction is a multiply-add or multiply-subtract instruction, compression array 825 and adder 851 add or subtract the products. The outputs of the adders including adder 851 (i.e., bits 63 through 32 of the Result) are combined into the 64-bit Result and communicated to Result Register 871. It will be appreciated that alternative embodiments of packed multiplier-adder/subtracter may accept source inputs of various sizes, 128 bits for example.

Figure 8C:
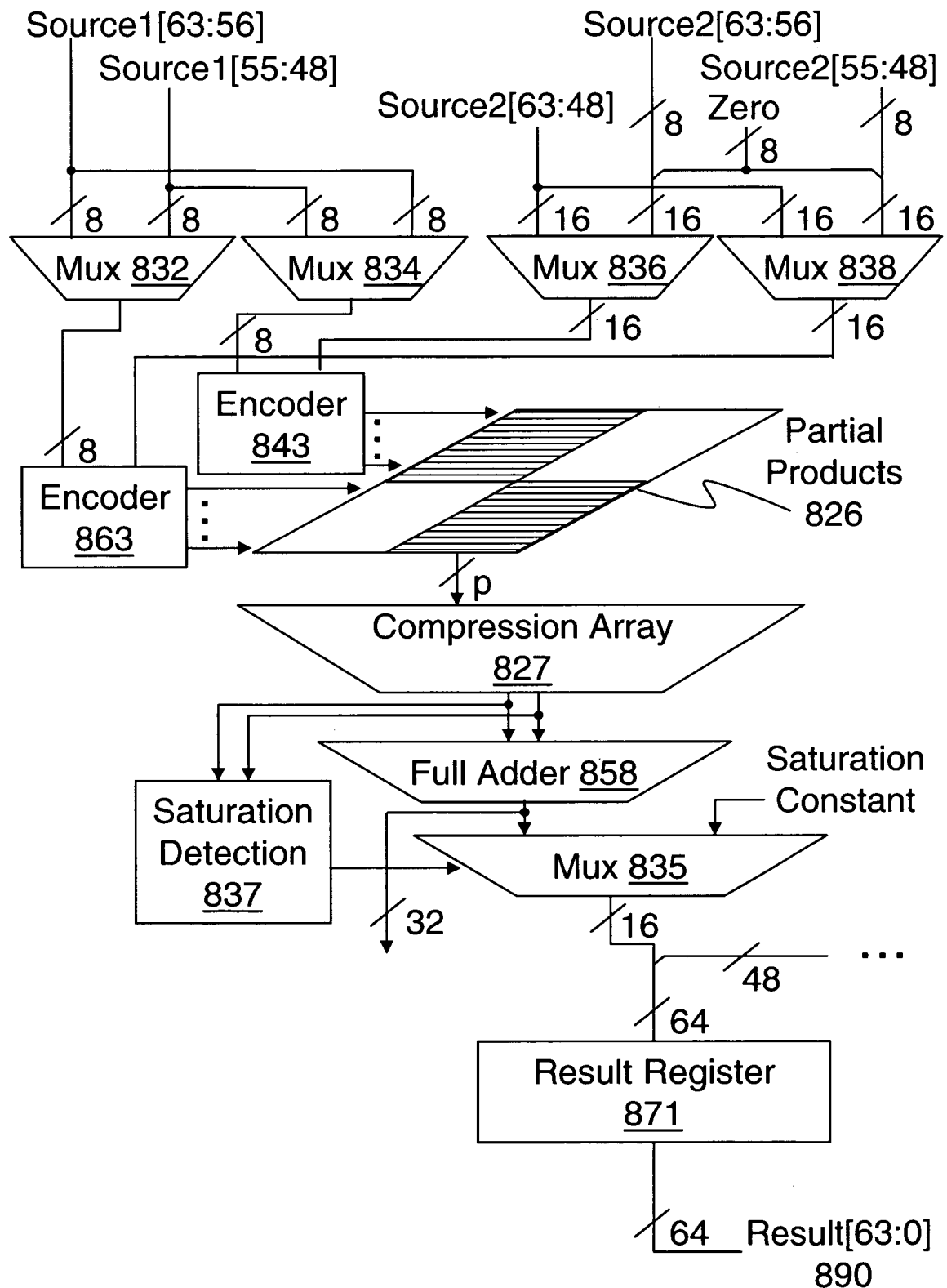

FIG. 8c illustrates a circuit for performing multiply-add and/or multiply-subtract operations on packed byte data or packed word data according to another alternative embodiment of the invention. The packed multiply-add/subtract circuit of FIG. 8c has inputs: Source1[63:48], Source2[63:48]. For one embodiment, when multiplexer (MUX) 832 selects Source1[63:56], MUX 834 selects Source1[55:48], and when MUX 836 and MUX 838 select Source2[63:48], a 16×16 multiplication may be performed substantially as described with reference to FIG. 8b. On the other hand, when MUX 832 selects Source1[55:48], MUX 834 selects Source1[63:56], MUX 836 selects Source2[63:56] and MUX 838 select Source2[55:48], two 8×8 multiplications may be performed as described below.

A 16×16 multiplier comprises encoder 863, which has as inputs Source1[55:48] from MUX 832 and Source2[55:48] from MUX 838. Encoder 863 selects partial products for the lower portion of partial products 826. Source2[55:48] from MUX 838 has eight upper bits padded with zeroes, and so the lower right quadrant of partial products 826 corresponds to partial products for the byte multiplication of Source1 [55:48] and Source2[55:48], while the lower left quadrant of partial products 826 contains zeroes. The 16×16 multiplier further comprises encoder 843, which has as inputs Source1[63:56] from MUX 834 and Source2[63:56] from MUX 836. Encoder 843 selects partial products for the upper portion of partial products 826. Source2[63:56] from MUX 836 has eight lower bits padded with zeroes so the upper left quadrant of partial products 826 corresponds to partial products for the byte multiplication of Source1[63:56] and Source2[63:56], while the upper right quadrant of partial products 826 contains zeroes. It will be appreciated that by aligning the partial products as described, addition of the two 16-bit products is facilitated through addition of the partial products.

Partial products 826 are provided as inputs to compression array 827, which provides inputs to full adder 858. Partial products 826 may be aligned to also facilitate generation of a 32-bit result. Therefore, in such cases, the outputs of full adder 858 corresponding to bits twenty-three through eight contain the 16-bit sum that may be provided to MUX 835, while the full 32-bit output of full adder 858 may be provided, for example, to full adder 851 when performing multiply-add/subtract operations on packed word data. For one embodiment, the outputs of the adders including adder 858 are optionally saturated to signed 16-bit values (i.e., bits 63 through 48 of the Result) and are then combined into the 64-bit Result and communicated to Result Register 871.

For one embodiment of saturation detection logic 837, all of the bits corresponding to the result may be examined in order to determine when to saturate. It will be appreciated that alternative embodiments of multiply-add/subtract operations, saturation detection logic 837 may examine less than all of the bits corresponding to the result.

From the inputs it is possible to determine the direction of the potential saturation and select a saturation constant to provide to MUX 851. A signed result has the potential to saturate to a negative hexadecimal value of 8000, only if both products are negative. For example, when one packed byte source has unsigned data elements and the other packed byte source has signed data elements, the negative hexadecimal saturation value of 8000 may be provided as the saturation constant to MUX 851 when both signed data elements, Source2[63:56] and Source2[55:48] for example, are negative. Similarly, since a signed result has the potential to saturate to a positive value, only if both products are positive, the positive hexadecimal saturation value of 7FFF may be provided as the saturation constant to MUX 851 when both signed data elements, Source2[63:56] and Source2[55:48] for example, are positive.

For one embodiment of the multiply-add/subtract only particular bit patterns may occur in signed results. Therefore it may be possible for saturation detection logic to identify the particular bit patterns which saturate. For example, using the sum bits, at bit positions 15 and 16 of a 17-bit adder prior to carry propagation and also using the carry-out of bit position 14, saturation detection logic may signal MUX 835 to saturate when sum[16:15] are 01, when sum[16:15] are 00 and Cout14 is 1, or when sum[16:15] are 10 and Cout14 is 0. Therefore saturation detection logic 837 may detect saturation before a final result is available from full adder 851.

Figure 8D:
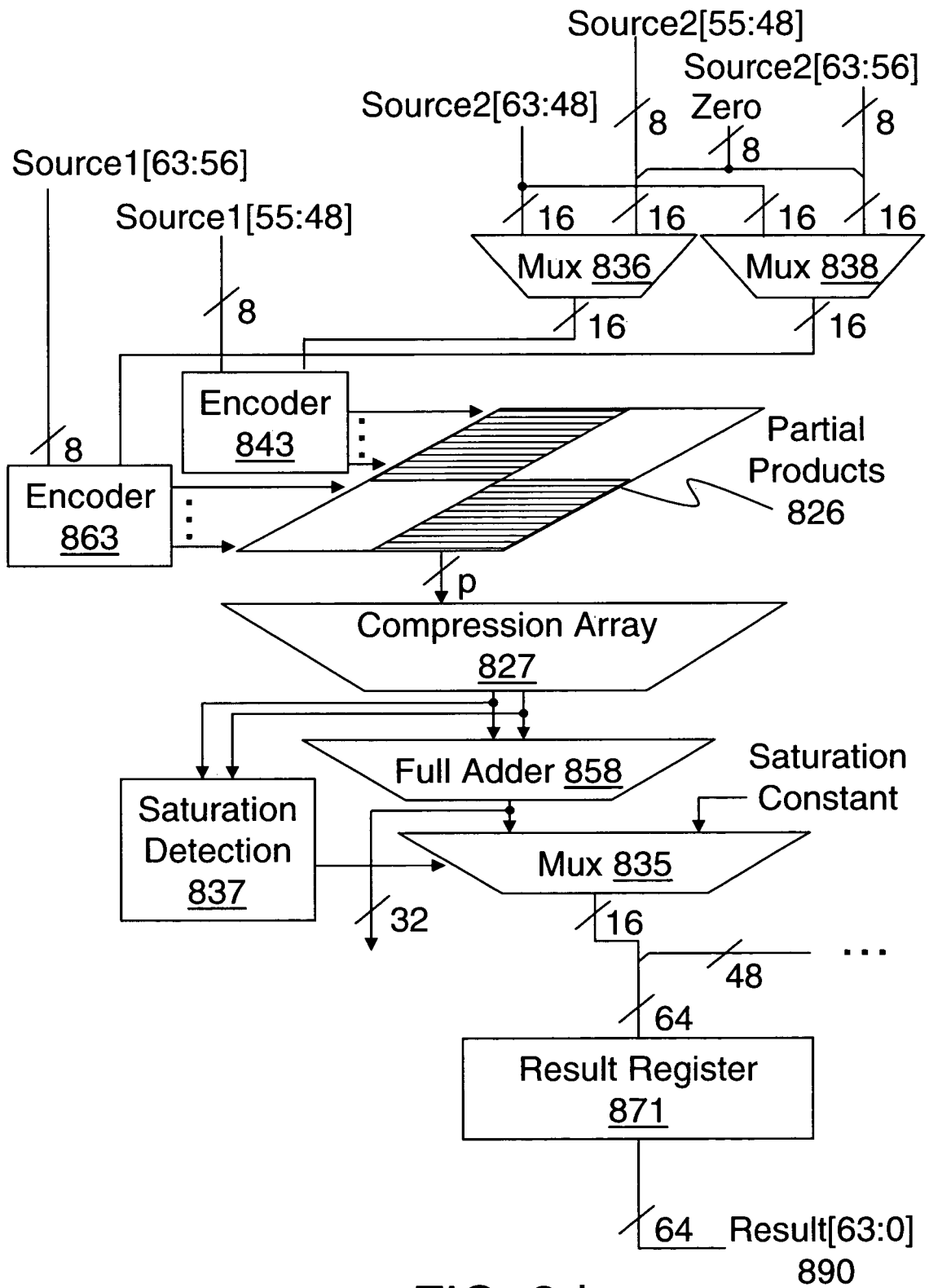

FIG. 8d illustrates another circuit for performing multiply-add and/or multiply-subtract operations on packed byte data or packed word data according to another alternative embodiment of the invention. The packed multiply-add/subtract circuit of FIG. 8d has inputs: Source1[63:48], Source2[63:48]. For one embodiment, when MUX 836 and MUX 838 select Source2[63:48], a 16×16 multiplication may be performed substantially as described with reference to FIG. 8b. On the other hand, when MUX 836 selects Source2[55:48] and MUX 838 select Source2[63:56], two 8×8 multiplications may be performed as described below.

A 16×16 multiplier comprises encoder 863, which has as inputs Source1[63:56] and Source2[63:56] from MUX 838. Encoder 863 selects partial products for the lower portion of partial products 826. Source2[63:56] from MUX 838 has eight upper bits padded with zeroes, and so the lower right quadrant of partial products 826 corresponds to partial products for the byte multiplication of Source1 [63:56] and Source2[63:56], while the lower left quadrant of partial products 826 contains zeroes. The 16×16 multiplier further comprises encoder 843, which has as inputs Source1[55:48] and Source2[55:48] from MUX 836. Encoder 843 selects partial products for the upper portion of partial products 826. Source2[55:48] from MUX 836 has eight lower bits padded with zeroes so the upper left quadrant of partial products 826 corresponds to partial products for the byte multiplication of Source1 [55:48] and Source2[55:48], while the upper right quadrant of partial products 826 contains zeroes. It will be appreciated that by aligning the partial products as described, addition of the two 16-bit products is facilitated through addition of the partial products.

Partial products 826 are provided as inputs to compression array 827, which provides inputs to full adder 858. Full adder 858 output bits twenty-three through eight contain the 16-bit sum that may be provided to MUX 835, while the full 32-bit output of full adder 858 may be provided, for example, to full adder 851 when performing multiply-add/subtract operations on packed word data. From the inputs it is possible to determine the direction of the potential saturation and select a saturation constant to provide to MUX 851. Saturation detection logic 837 may detect saturation before a final result is available from full adder 851. For one embodiment, the outputs of the adders including adder 858 are optionally saturated to signed 16-bit values (i.e., bits 63 through 48 of the Result) are and are then combined into the 64-bit Result and communicated to Result Register 871.

Figure 9A:
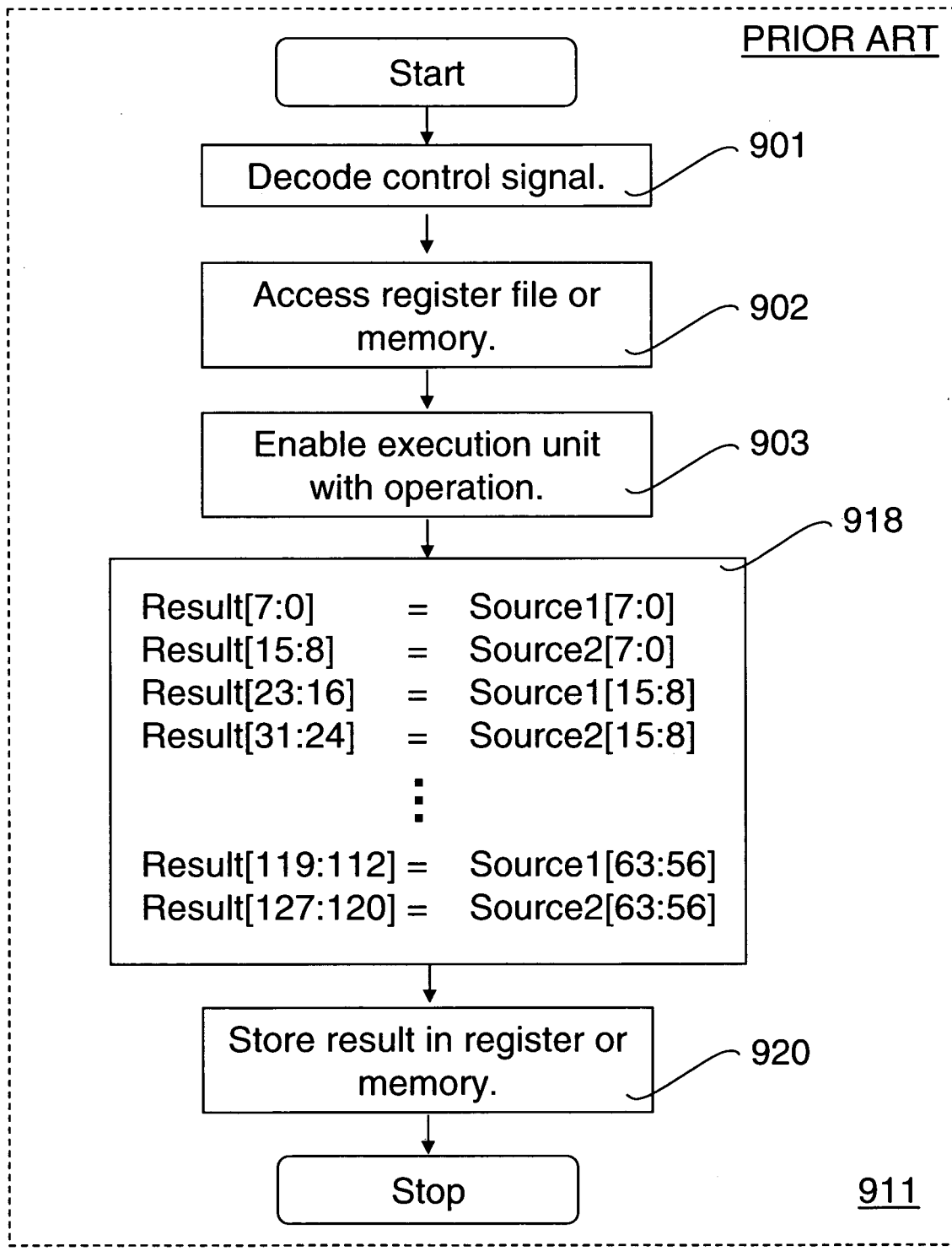
FIGS. 9a-9b illustrate flow diagrams of prior art processes for performing unpack operations on packed data.
Figure 9B:
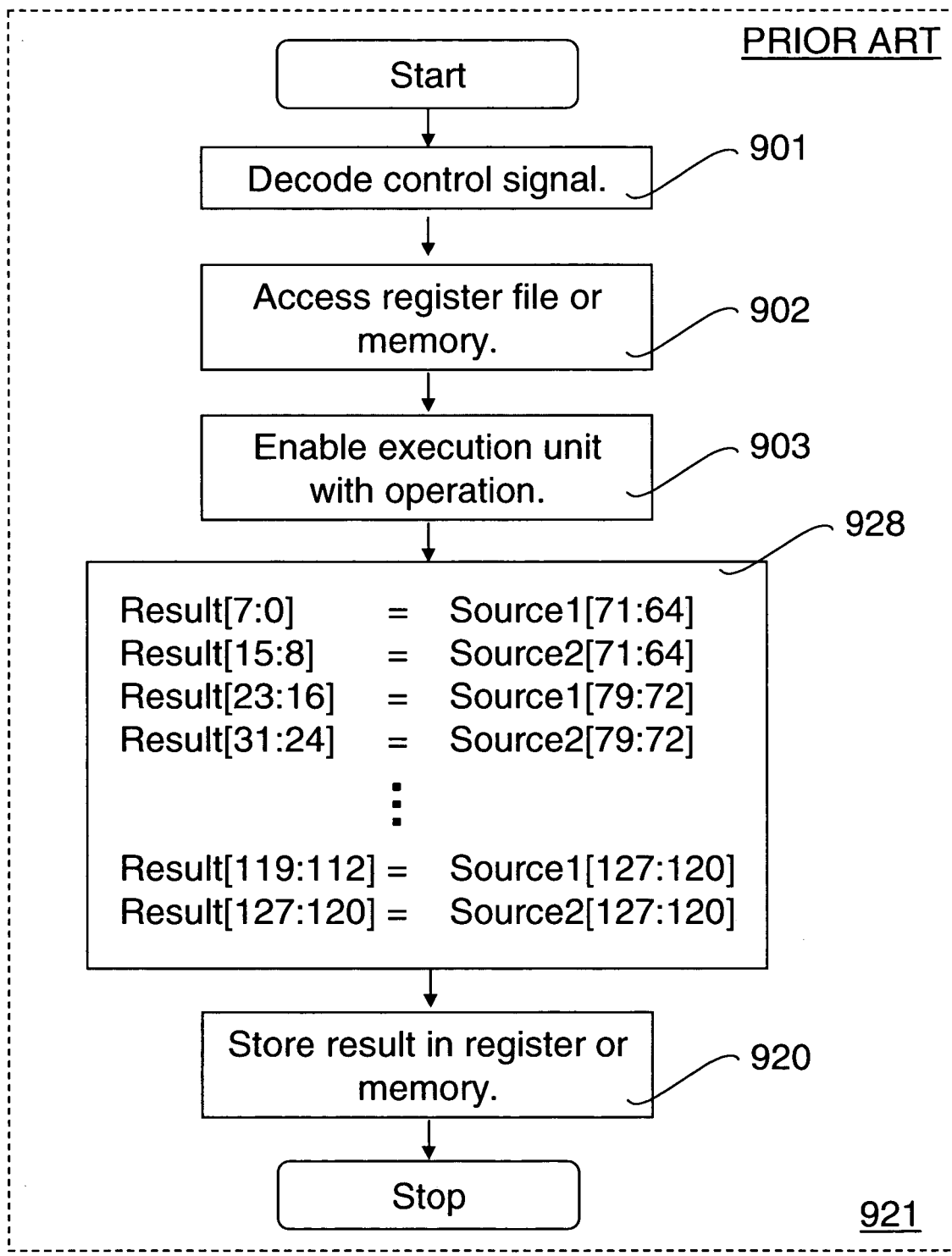

FIGS. 9a-9b illustrate flow diagrams of prior art processes for performing unpack operations on packed data. In processing block 901, decoder 165 decodes the control signal received by processor 109. Thus, decoder 165 decodes the operation code for an unpack instruction. In processing block 902, via internal bus 170, decoder 165 accesses registers 210 in register file 150 given the SRC1 602 and SRC2 603 addresses. Registers 210 provide execution unit 130 with the packed data stored in the SRC1 602 register (Source1), and the packed data stored in SRC2 603 register (Source2). That is, extension registers 210 (or registers 209) communicate the packed data to execution unit 130 via internal bus 170. In processing block 903, decoder 165 enables execution unit 130 to perform the instruction. If the instruction is an unpack instruction for processing low order byte data of Source1 and Source2, flow passes to processing block 918.

In processing block 918, the following is performed. Source1 bits seven through zero are stored to Result bits seven through zero. Source2 bits seven through zero are stored to Result bits fifteen through eight. Source1 bits fifteen through eight are stored to Result bits twenty-three through sixteen. Source2 bits fifteen through eight are stored to Result bits thirty-one through twenty-four and so forth, interleaving low order bytes from Source1 and Source2 . . . until Source1 bits sixty-three through fifty-six are stored to Result bits one hundred nineteen through one hundred twelve and Source2 bits sixty-three through fifty-six are stored to Result bits one hundred twenty-seven through one hundred and twenty.

If the instruction is an unpack instruction for processing high order byte data of Source1 and Source2, flow passes to processing block 928.

In processing block 928, the following is performed. Source1 bits seventy-one through sixty-four are stored to Result bits seven through zero. Source2 bits seventy-one through sixty-four are stored to Result bits fifteen through eight. Source1 bits seventy-nine through seventy-two are stored to Result bits twenty-three through sixteen. Source2 bits seventy-nine through seventy-two are stored to Result bits thirty-one through twenty-four and so forth, interleaving high order bytes from Source1 and Source2 . . . until Source1 bits one hundred twenty-seven through one hundred and twenty are stored to Result bits one hundred nineteen through one hundred twelve and Source2 bits one hundred twenty-seven through one hundred and twenty are stored to Result bits one hundred twenty-seven through one hundred and twenty.

In processing block 920, the Result is stored in the DEST register.

Similarly, unpack instructions may interleave 16-bit, 32-bit, or 64-bit data from two sources. It will be appreciated that while the current unpack instructions perform useful operations for interleaving data from two sources, other reordering operations may also be desirable.

Figure 10A:
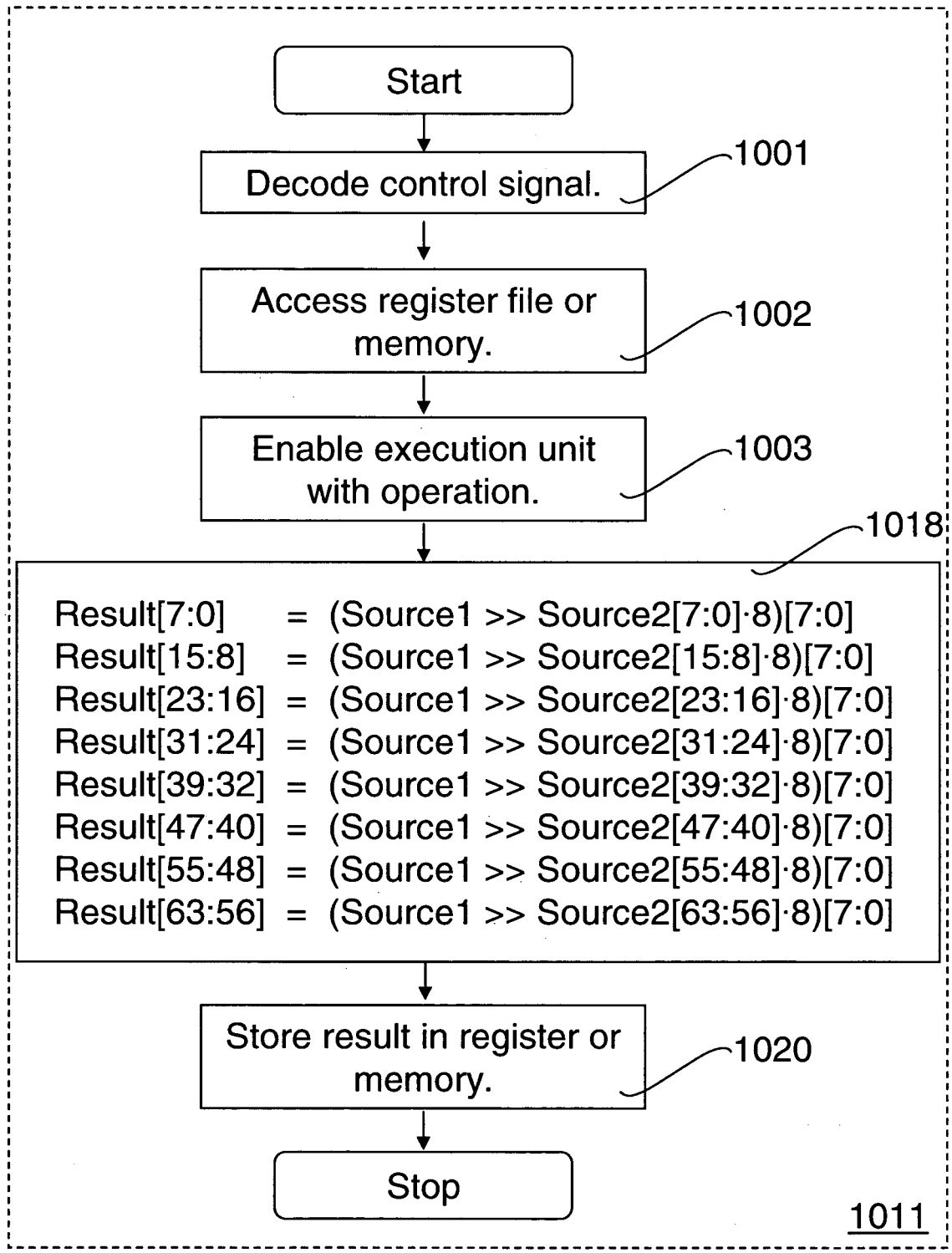
FIGS. 10a-10b illustrate flow diagrams for various alternative embodiments of processes for performing shuffle operations on packed data.

FIG. 10a illustrates a flow diagram for one embodiment of a process 1011 for performing shuffle operations on packed byte data. In processing block 1001, decoder 165 decodes the control signal received by processor 109. Thus, decoder 165 decodes the operation code for a shuffle instruction. In processing block 1002, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). In processing block 1003, decoder 165 enables execution unit 130 to perform the instruction. If the instruction is a shuffle instruction for processing byte data, flow passes to processing block 1018.

In processing block 1018, the following is performed. A byte of Source1 data at a position indicated by bits seven through zero of Source2 is stored to Result bits seven through zero. In other words, if bits seven through zero of Source2 hold a hexadecimal value of 04 then the fourth byte (bits thirty-nine through thirty-two) of Source1 is stored to Result bits seven through zero. Likewise a byte of Source1 data at the position indicated by bits fifteen through eight of Source2 is stored to Result bits fifteen through eight, and so forth . . . until a byte of Source1 data at the position indicated by bits sixty-three through fifty-six of Source2 is stored to Result bits sixty-three through fifty-six.

In processing block 1020, the Result is stored in the DEST register.

Figure 10B:
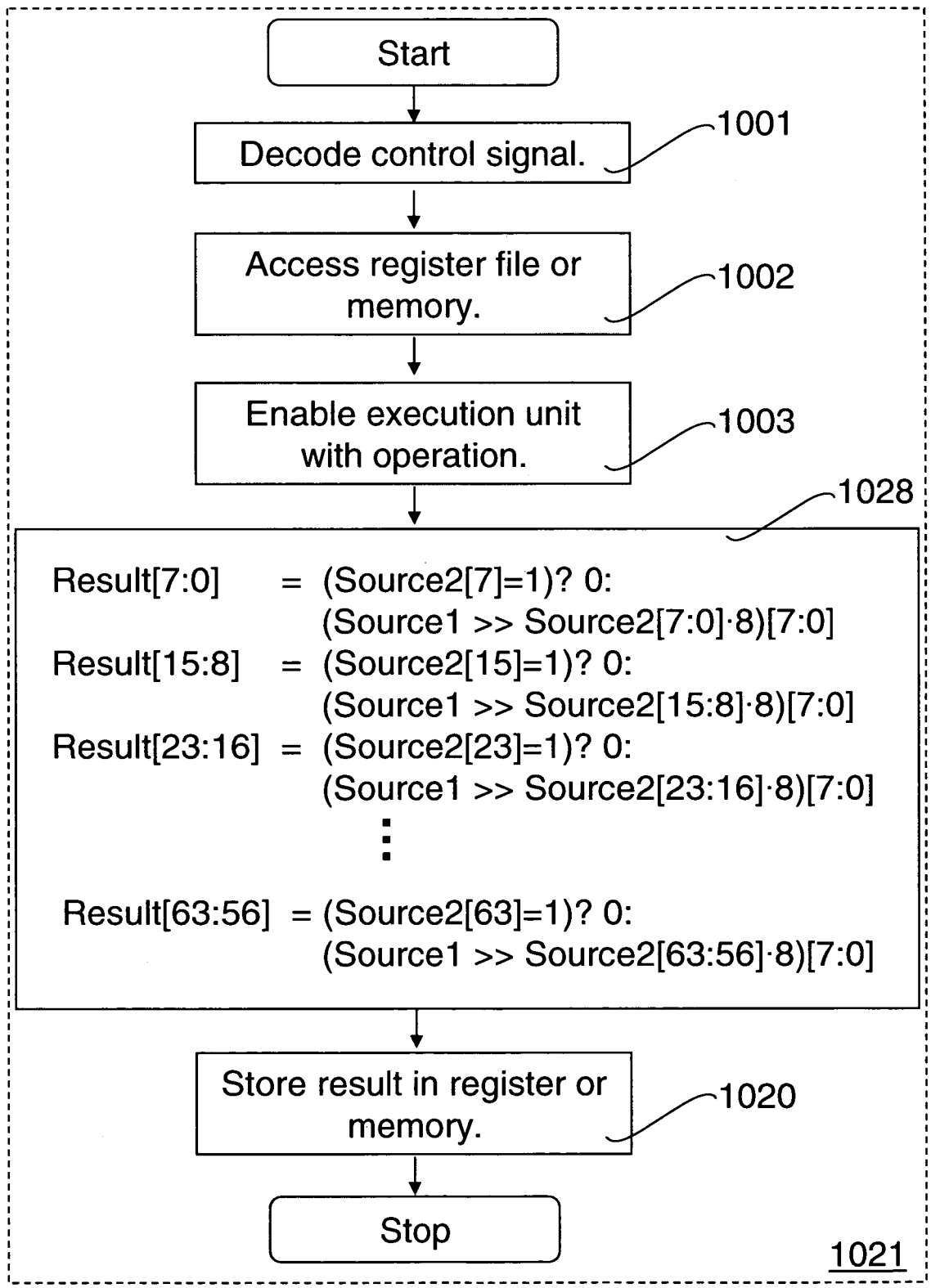

FIG. 10b illustrates a flow diagram for an alternative embodiment of a process 1021 for performing shuffle operations on packed byte data. In processing block 1001 through 1003 processing is substantially similar to that of process 1011 if the instruction is a shuffle instruction for processing 64-bits of packed byte data.

In processing block 1028, the following is performed. Unless bit seven of Source2 (the most significant bit of bits seven through zero) is set (equal to 1) the byte of Source1 data at a position indicated by bits seven through zero of Source2 is stored to Result bits seven through zero; otherwise Result bits seven through zero are cleared (set equal to 0). Likewise, unless bit fifteen of Source2 is set, the byte of Source1 data at the position indicated by bits fifteen through eight of Source2 is stored to Result bits fifteen through eight, otherwise Result bits fifteen through eight are cleared; and so forth . . . until finally, unless bit sixty-three of Source2 is set, the byte of Source1 data at the position indicated by bits sixty-three through fifty-six of Source2 is stored to Result bits sixty-three through fifty-six otherwise Result bits sixty-three through fifty-six are cleared.

In processing block 1020, the Result is stored in the DEST register.

Figure 10C:
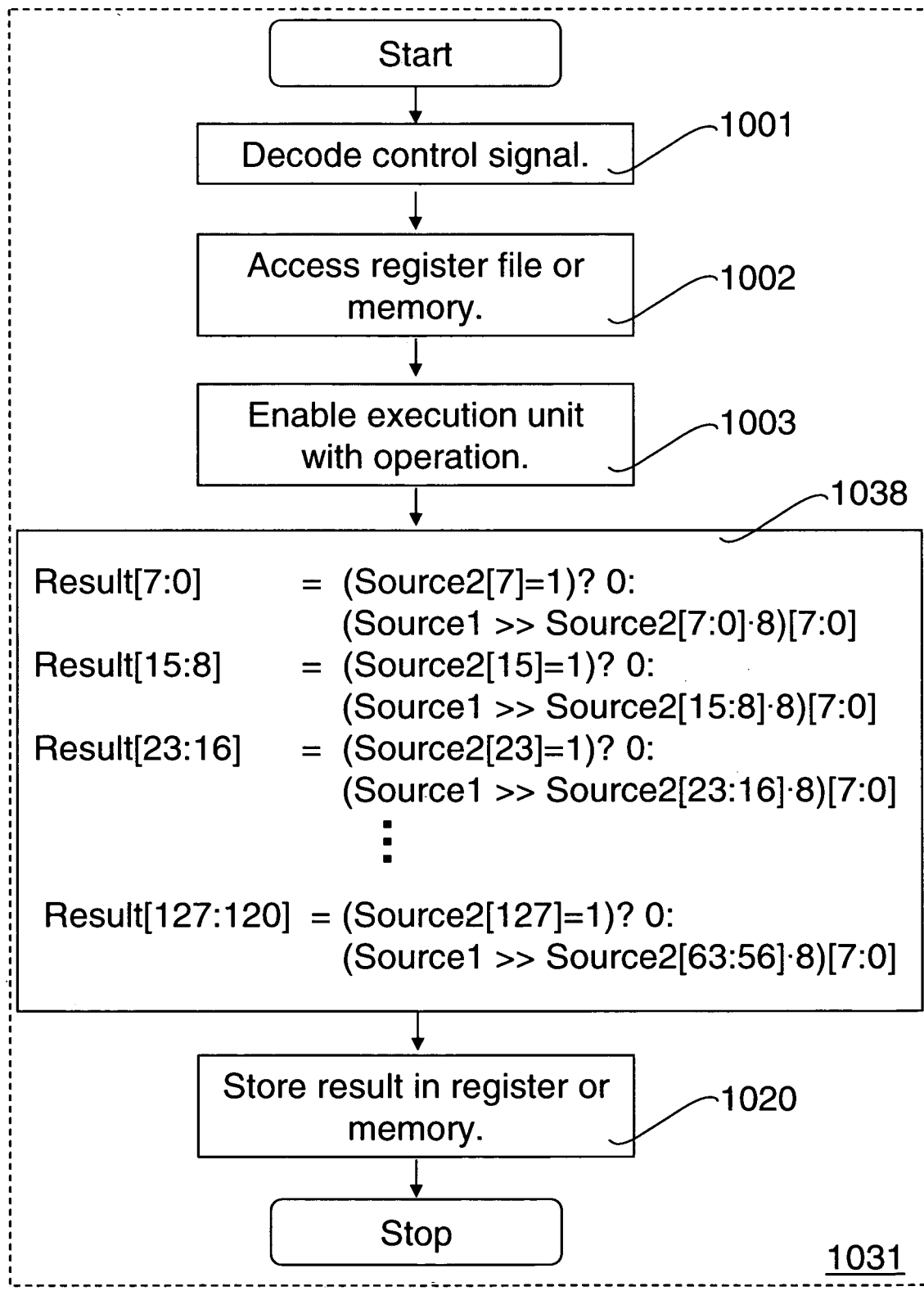

FIG. 10*c* illustrates a flow diagram for another embodiment of a process 1031 for performing shuffle operations on 128 bits of packed byte data. In processing block 1001, decoder 165 decodes the control signal received by processor 109. Thus, decoder 165 decodes the operation code for a shuffle instruction. In processing block 1002, via internal bus 170, decoder 165 accesses registers 210 in register file 150 given the SRC1 602 and SRC2 603 addresses. Registers 210 provide execution unit 130 with the packed data stored in the SRC1 602 register (Source1), and the packed data stored in SRC2 603 register (Source2). In processing block 1003, decoder 165 enables execution unit 130 to perform the instruction. If the instruction is a shuffle instruction for processing 128 bits of packed byte data, flow passes to processing block 1038.

In processing block 1038, the following is performed. Unless bit seven of Source2 is set, the byte of Source1 data at a position indicated by bits seven through zero of Source2 is stored to Result bits seven through zero, otherwise Result bits seven through zero are cleared. Likewise, unless bit fifteen of Source2 is set, the byte of Source1 data at the position indicated by bits fifteen through eight of Source2 is stored to Result bits fifteen through eight, otherwise Result bits fifteen through eight are cleared; and so forth . . . until finally, the byte of Source1 data at the position indicated by bits one hundred twenty-seven through one hundred and twenty of Source2 is stored to Result bits one hundred twenty-seven through one hundred and twenty, unless bit one hundred twenty-seven of Source2 is set, in which case Result bits one hundred twenty-seven through one hundred and twenty are cleared.

Again, in processing block 1020, the Result is stored in the DEST register.

Figure 11A:
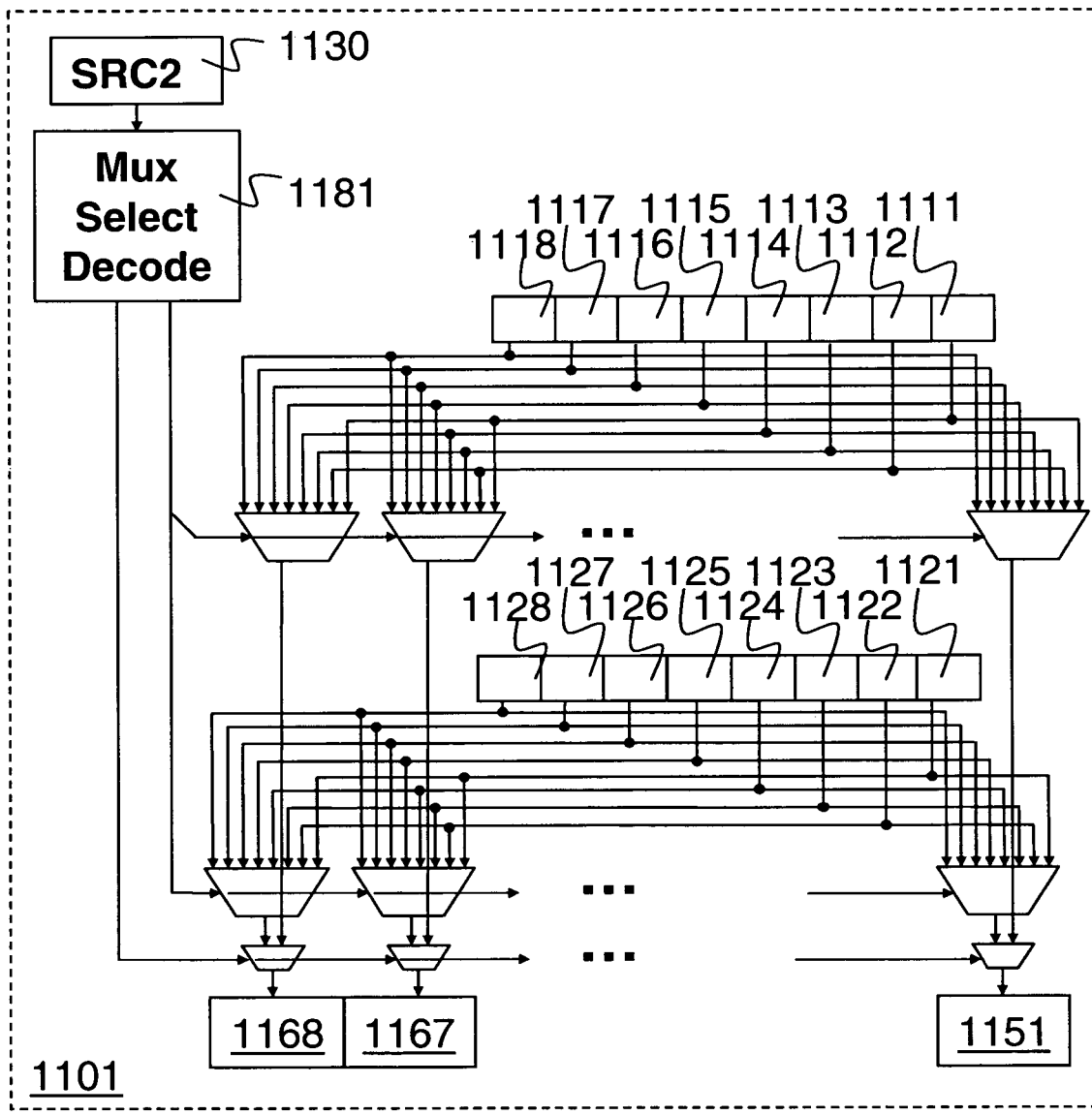
FIGS. 11a-11b illustrate alternative embodiments of circuits for performing shuffle operations on packed data.

FIG. 11*a* illustrates one embodiment of a circuit 1101 for performing shuffle operations on packed data. Circuit 1101 comprises a first array of byte multiplexers (MUXes) each having as inputs the eight bytes (1111-1118) of Source1 bits sixty-three through zero; a second array of byte multiplexers each having as inputs the eight bytes (1121-1128) of Source1 bits one hundred twenty-seven through sixty-four; a third array of multiplexers each having as inputs a pair of multiplexer outputs, a first from the first array and a second from the second array, and each having an output to produce one of sixteen bytes (1151-1168) of Result bits one hundred twenty-seven through zero; a MUX select decode circuit 1181 to select inputs at each of the MUXes of the first, second and third arrays according to the input it receives from SRC2 1130. Therefore according to the sixteen byte fields of Source2 from SRC2 1130, any one of the sixteen bytes (1111-1118 and 1121-1128) of Source1 may be selected to be stored as any one of the sixteen bytes (1151-1168) of the Result.

Figure 11B:
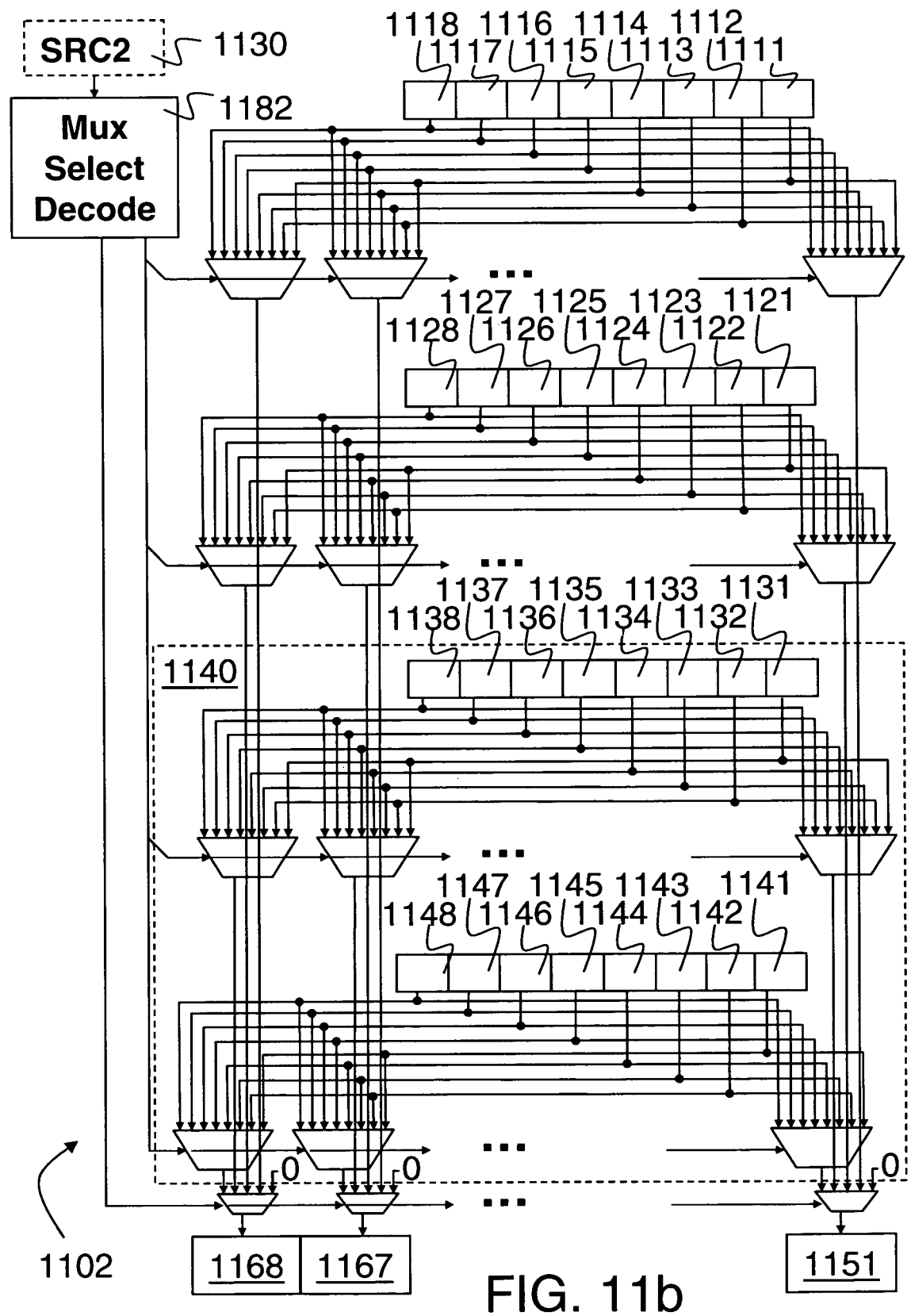

FIG. 11*b* illustrates an alternative embodiment of a circuit 1102 for performing shuffle operations on packed data. Like circuit 1101, circuit 1102 comprises the first array of byte multiplexers each having as inputs the eight bytes (1111-1118) of Source1 bits sixty-three through zero; and the second array of byte multiplexers each having as inputs the eight bytes (1121-1128) of Source 1 bits one hundred twenty-seven through sixty-four; but the third array of multiplexers each have as inputs the pair of multiplexer outputs, a first from the first array and a second from the second array, and a zero input to selectively clear an output to produce one of sixteen bytes (1151-1168) of Result bits one hundred twenty-seven through zero. Circuit 1102 further comprises MUX select decode circuit 1182 to select inputs at each of the MUXes of the first, second and third arrays according to the input it optionally receives from SRC2 1130. Optionally, MUX select decode circuit 1182 also selects inputs at each of an optional second set of multiplexer arrays 1140, which comprise a fourth array of byte multiplexers each having as inputs the eight bytes (1131-1138) of Source2 bits sixty-three through zero; and a fifth array of byte multiplexers each having as inputs the eight bytes (1141-1148) of Source2 bits one hundred twenty-seven through sixty-four. Therefore the third array of multiplexers each have as optional inputs another pair of multiplexer outputs, a first from the fourth array and a second from the fifth array, to produce any byte from Source1 or from Source2 or a zero as one of sixteen bytes (1151-1168) of Result bits one hundred twenty-seven through zero. Therefore, circuit 1102 may perform other operations, for example unpack operations from two registers, as well as shuffle operations.

Bi-Linear Interpolation and Motion Compensation Overview

Figure 12:
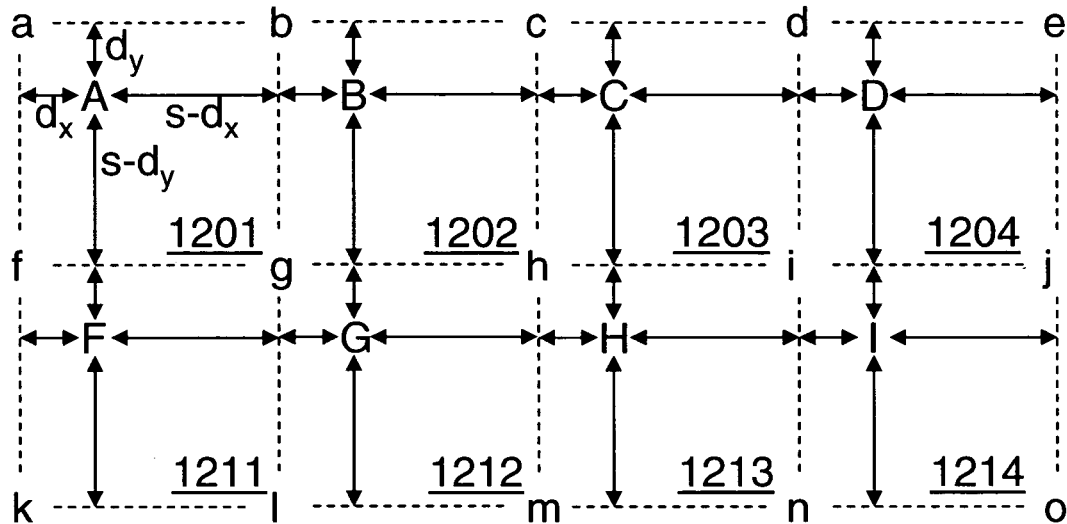
FIG. 12 illustrates one exemplary embodiment of a bi-linear interpolation and motion compensation of content data.

FIG. 12 illustrates one exemplary embodiment of a bi-linear interpolation and motion compensation of content data. FIG. 12 illustrates a first line of 2n+1 bytes (a, b, c, d and e) and a second line of 2n+1 bytes (f, g, h, i, and j). Bi-linear interpolation and motion compensation may be performed, for example at quarter-pixel or eighth-pixel luminance resolution, on sub-sampled chrominance values to obtain 2n interpolated values (A, B, C and D). The calculations are of the form 1220, for example:

$$A=((s-d_x)(s-d_y)a+d_x(s-d_y)b+(s-d_x)d_yf+d_xd_yg+s^2/2)/s^2,$$

$$B=((s-d_x)(s-d_y)b+d_x(s-d_y)c+(s-d_x)d_yg+d_xd_yh+s^2/2)/s^2,$$

$$C=((s-d_x)(s-d_y)c+d_x(s-d_y)d+(s-d_x)d_yh+d_xd_yi+s^2/2)/s^2, \text{ and}$$

$$D=((s-d_x)(s-d_y)d+d_x(s-d_y)e+(s-d_x)d_yi+d_xd_yj+s^2/2)/s^2.$$

Therefore, for quarter-pixel luminance resolution, chrominance values may be interpolated bi-linearly according to eight fractional parts, in other words s=8 (or sixteen fractional parts for eighth-pixel luminance resolution, etc.). The values such as $s^2/2$ and $s^2$ (or when shifting is used to replace division by $s^2$, the value $\log_2 s^2$) may be calculated once in advance of the interpolation. Further as seen above and for each of blocks 1201-1204, the distances $d_x$, $d_y$, $s-d_x$ and $s-d_y$ will be the same. Therefore the area product coefficients 1230, may be calculated once in preparation of each of 2n calculation of the form 1220, to produce 2n interpolated values (A, B, C and D). Similarly for the next line of 2n interpolated values (F, G, H and 1) and as shown by equations 1240, prepared area coefficients may be multiplied with shuffled line elements.

Bi-linear interpolations have been proposed by the Joint Video Team of the International Telecommunication Union (ITU) Video Coding Experts Group (VCEG) and the International Organization for Standardization/International Electrotechnical Commission (ISO/IEC) Motion Picture Experts Group (MPEG) for fractional-pixel chrominance motion compensation in accordance with the H.264 standard (see Final Committee Draft of ISO/IEC 14496-10 Advanced Video Coding). It will be appreciated that bi-linear interpolation may be broadly useful in many other image processing or video processing applications. Especially in applications where small integer data types are used and have sufficient representational range, the techniques detailed below may also be found useful.

Figure 13A:
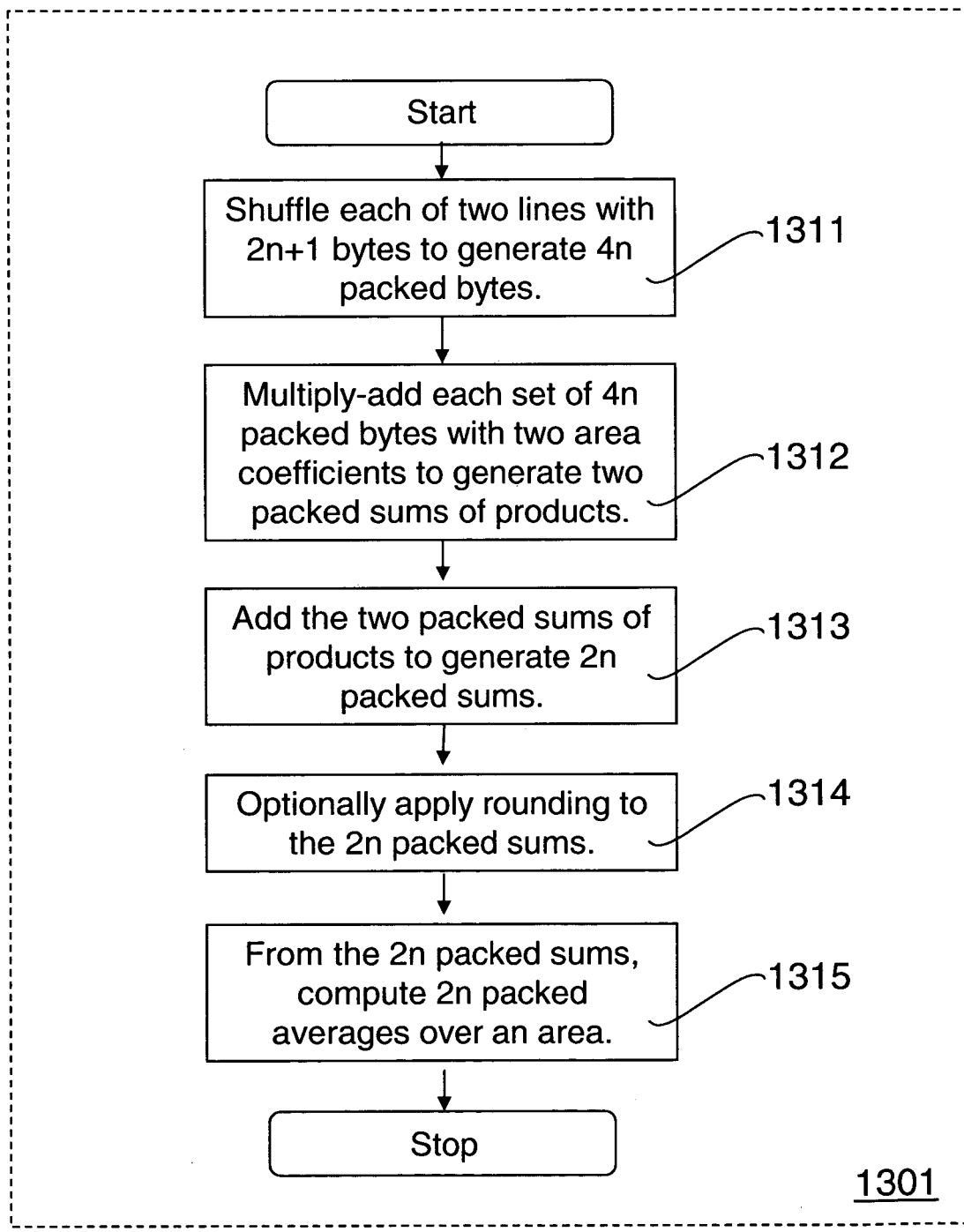
FIGS. 13a-13c illustrate flow diagrams of alternative embodiments for processes to perform bi-linear interpolation and motion compensation.

FIG. 13a illustrates a flow diagram of embodiments for a process 1301 to perform bi-linear interpolation and motion compensation. It will be appreciated that while process 1301 and other processes herein disclosed are illustrated, for the purpose of clarity, as processing blocks with a particular sequence, some operations of these processing blocks may also be conveniently performed in parallel or their sequence may be conveniently permuted so that the some operations are performed in different orders, or some operations may be conveniently performed out of order.

In processing block 1311, each of two lines, a first line with 2n+1 byte elements and a second line with 2n+1 byte elements are shuffled to generate packed data comprising, respectively, a first 4n packed byte elements and a second 4n packed byte elements. In processing block 1312, a multiply-add operation is performed on the first packed byte data and at least two area coefficients to generated a third packed data including 16-bit sums of products, and a multiply-add operation is performed on the second 4n packed byte data and at least two more area coefficients to generated a fourth packed data including 16-bit sums of products. Processing proceeds to processing block 1313 where a packed result including 2n sums is generated by adding corresponding sums of products of the third and fourth packed data. In processing block 1314, rounding is optionally applied to the 2n sums, for example by adding a constant to each sum at a particular bit position. In processing block 1315, 2n packed averages over an area are computed from the 2n packed sums.

Figure 13B:
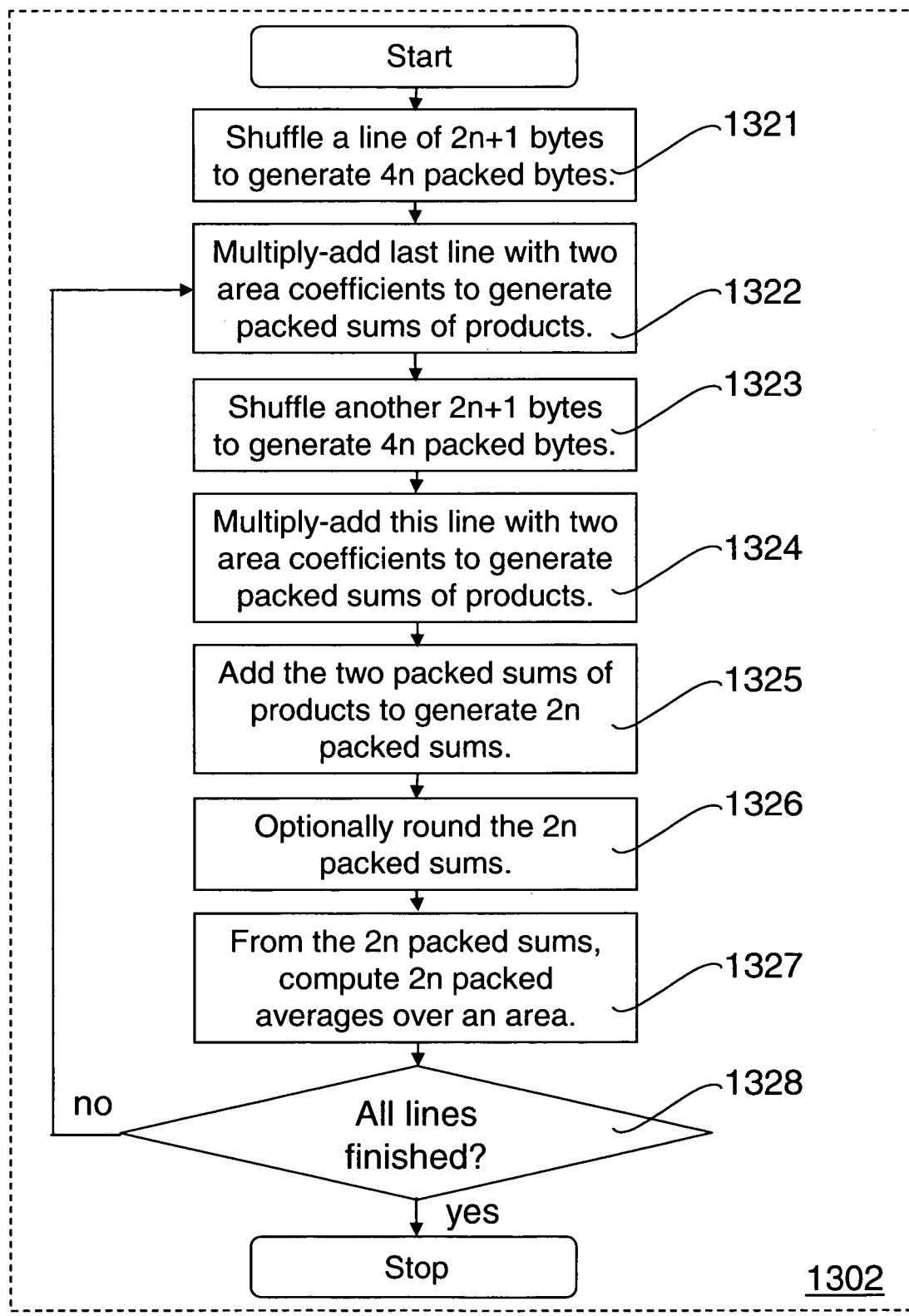

FIG. 13b illustrates a flow diagram of embodiments for a process 1302 to perform bi-linear interpolation and motion compensation. In processing block 1321, a line with 2n+1 byte elements is shuffled to generate a packed data comprising 4n packed byte elements. In processing block 1322, a multiply-add operation is performed on the shuffled 4n packed byte data and at least two area coefficients to generated a packed data including 16-bit sums of products. In processing block 1323, another line with 2n+1 byte elements is shuffled to generate a packed data comprising a second 4n packed byte elements. In processing block 1324, a multiply-add operation is performed on the second 4n packed byte data and at least two more area coefficients to generated another packed data including 16-bit sums of products. Processing proceeds to processing block 1325 where a packed result including 2n sums is generated by adding corresponding elements of the last two packed 16-bit sums of products generated. In processing block 1326, rounding is optionally applied to the 2n sums. In processing block 1327, 2n packed averages (for example A, B, C and D of FIG. 12) over an area ($s^2$) are computed from the 2n packed sums. In processing block 1328, a test is performed to determine if processing of the input rows of the content data finished, in which case processing stops. Otherwise processing repeats the processing blocks 1322-1327, to generate another 2n packed averages (for example, F, G, H and I of FIG. 12) over an area.

Figure 13C:
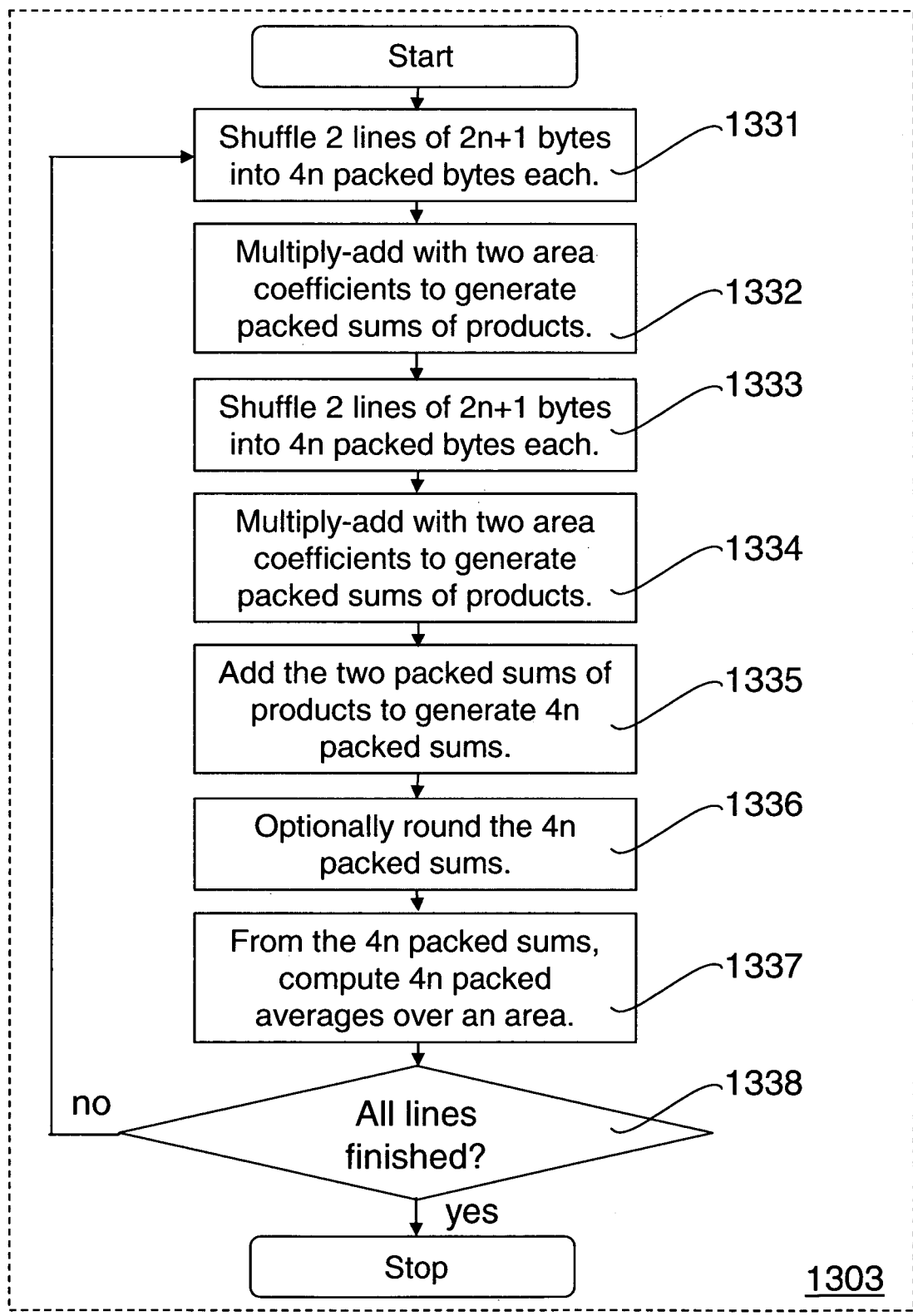

FIG. 13c illustrates a flow diagram of embodiments for a process 1303 to perform bi-linear interpolation and motion compensation. In processing block 1331, each of two lines, a first line with 2n+1 byte elements and a second line with 2n+1 byte elements are shuffled to generate packed data comprising a first 4n byte elements and a second 4n byte elements. In processing block 1332, a multiply-add operation is performed on the shuffled packed byte data and at least two area coefficients to generated a packed data including 16-bit sums of products. In processing block 1333, each of two lines, with 2n+1 byte elements are shuffled to generate more packed data comprising 4n byte elements for each of the last two line of 2n+1 bytes shuffled. In processing block 1334, a multiply-add operation is performed on the second shuffled packed byte data and at least two more area coefficients to generated another packed data including 16-bit sums of products. Processing proceeds to processing block 1335 where a packed result including 4n sums is generated by adding corresponding elements of the last two packed 16-bit sums of products generated. In processing block 1336, rounding is optionally applied to the 4n sums. In processing block 1337, 4n packed averages over an area (for example, A, B, C, D, F, G, H and I of FIG. 12, as illustrated in greater detail with respect to FIGS. 14-16) are computed from the 4n packed sums. In processing block 1338, a test is performed to determine if processing of the input rows of the content data is finished, in which case processing stops. Otherwise processing repeats the processing blocks 1331-1337, to generate another 4n packed averages over an area.

Figure 14A:
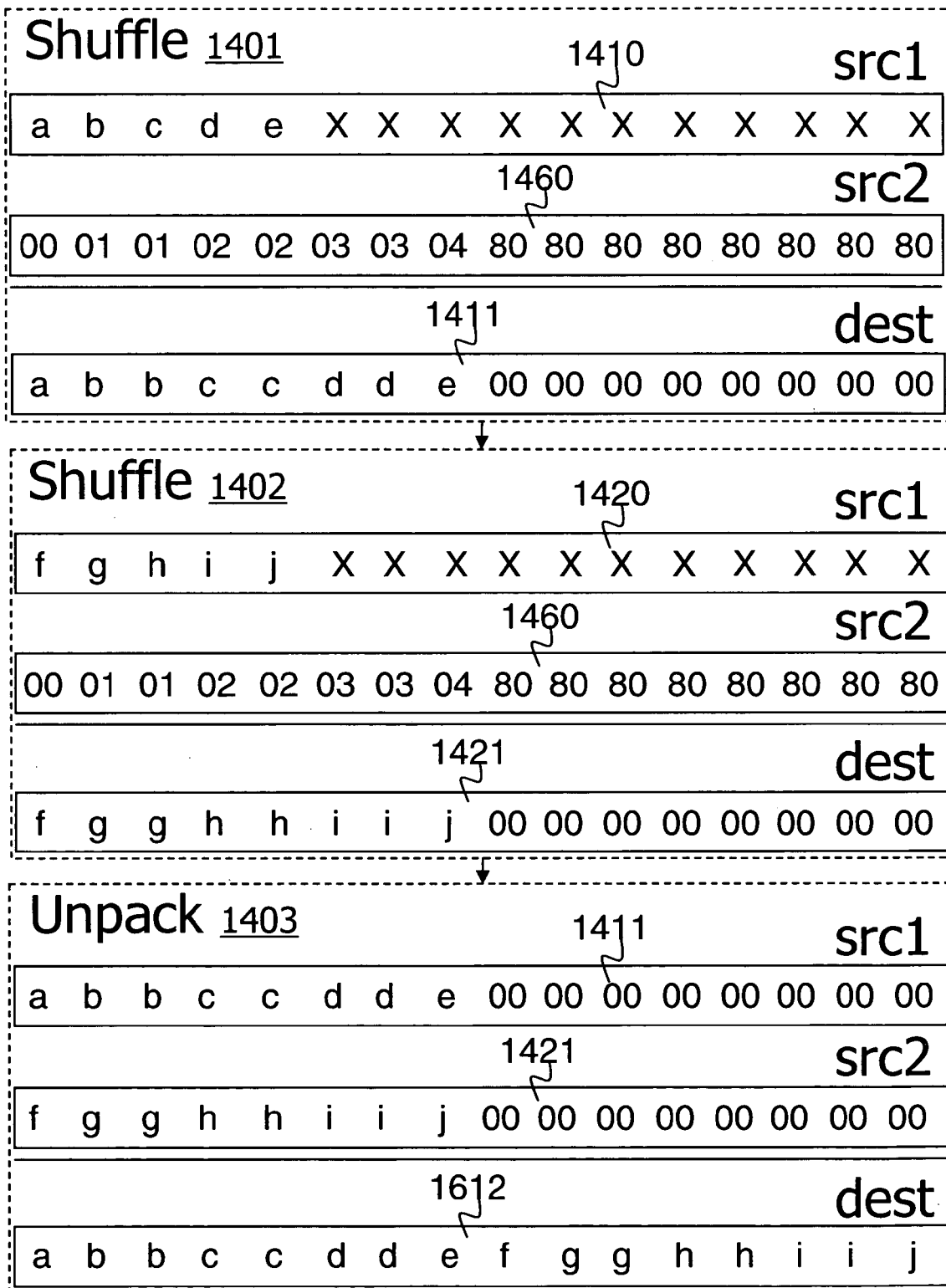
FIGS. 14a-14b illustrate a flow diagram of one embodiment for a process to shuffle content data.
Figure 14B:
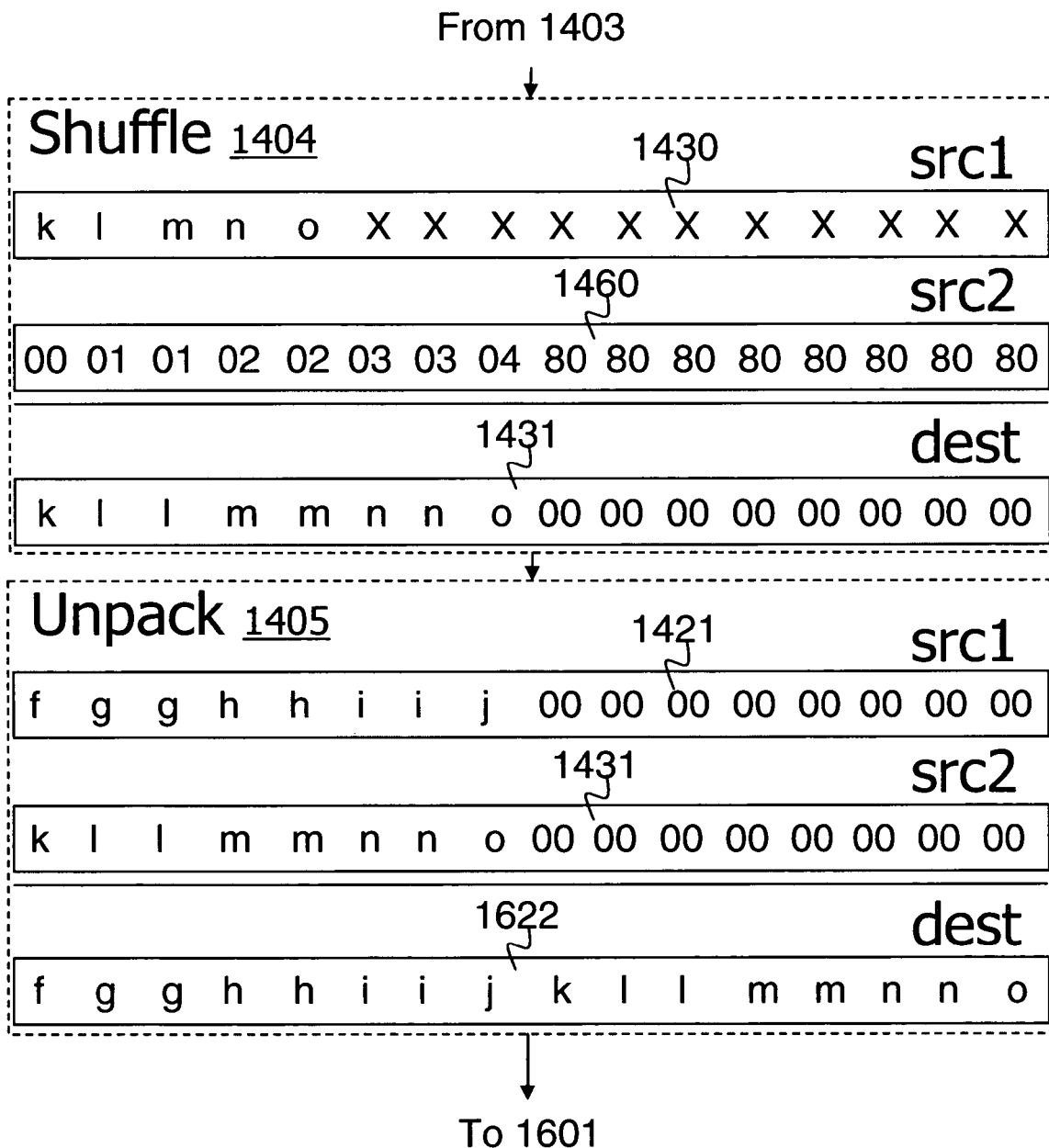

FIGS. 14a-14b illustrate a flow diagram of one embodiment for a process to shuffle content data. For the sake of clarity, examples illustrated in FIGS. 14a-14b, FIGS. 15a-15b, and FIGS. 16a-16b show data ordered from left to right consistent with a memory ordering of the data shown in FIG. 12. It will be appreciated that some register orderings (for example, little-endian) reverse the in-register ordering of elements (addresses increasing from right to left) with respect to their memory ordering (addresses increasing left to right). Never the less, operations illustrated may be carried out in substantially the same manner.

In processing block 1401, a line 1410 with 2n+1 byte elements stored in SRC1 is shuffled according to according to packed data 1460 stored in SRC2 to generate Result 1411 comprising a first 4n byte elements. Unless the most significant bit of a byte element of packed data 1460 is set, data of byte elements 1410 in the byte position indicated by said byte element of packed data 1460 is stored to Result 1411 in the byte position corresponding to said byte element of packed data 1460, otherwise that Result 1411 byte position is cleared.

In processing block 1402 a line 1420 with 2n+1 byte elements stored in SRC1 is shuffled according to according to packed data 1460 stored in SRC2 to generate Result 1421 comprising a second 4n byte elements. Unless the most significant bit of a byte element of packed data 1460 is set, data of byte elements 1420 in the byte position indicated by said byte element of packed data 1460 is stored to Result 1421 in the byte position corresponding to said byte element of packed data 1460, otherwise that Result 1421 byte position is cleared.

In processing block 1403, Result 1411 comprising a first 4n byte elements and Result 1421 comprising a second 4n byte elements are unpacked, interleaving the least significant 64-bit quadwords from Result 1411 and Result 1421 to generate Result 1612 comprising 2 lines of shuffled bytes.

In processing block 1404 a line 1430 with 2n+1 byte elements stored in SRC1 is shuffled according to according to packed data 1460 stored in SRC2 to generate Result 1431 comprising a third 4n byte elements. Unless the most significant bit of a byte element of packed data 1460 is set, data of byte elements 1430 in the byte position indicated by said byte element of packed data 1460 is stored to Result 1431 in the byte position corresponding to said byte element of packed data 1460, otherwise that Result 1431 byte position is cleared.

In processing block 1405, Result 1421 comprising the second 4n byte elements and Result 1431 comprising the third 4n byte elements are unpacked, interleaving the least significant 64-bit quadwords from Result 1421 and Result 1431 to generate Result 1622 comprising 2 more lines of shuffled bytes.

It will be appreciated that shuffling the lines of bytes may be performed in various ways. For example, the use of an unpack instruction may not always be necessary, being replaceable by one or more logical operations such as an OR operation if the elements of the respective lines are shuffled to alternate sides of Result 1411 and Result 1421 respectively. Further, in a processor which includes instructions for storing data into a portion of a register, for example, or instructions for masking data, or shuffle instructions for accessing register pairs as a single operand, alternative embodiments for a process to shuffle content data may be used.

Figure 15A:
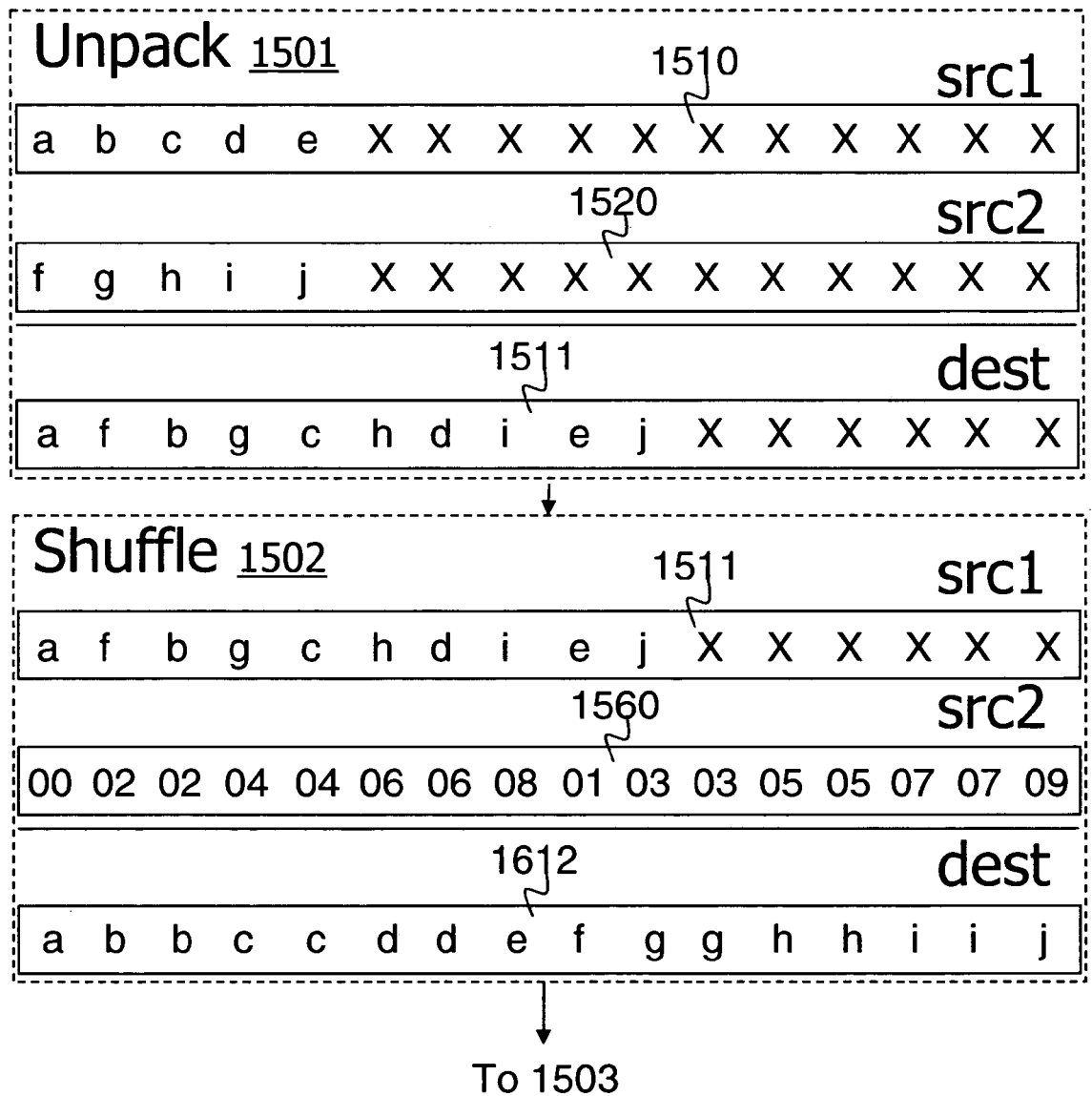
FIGS. 15a-15b illustrate a flow diagram of an alternative embodiment for a process to shuffle content data.
Figure 15B:
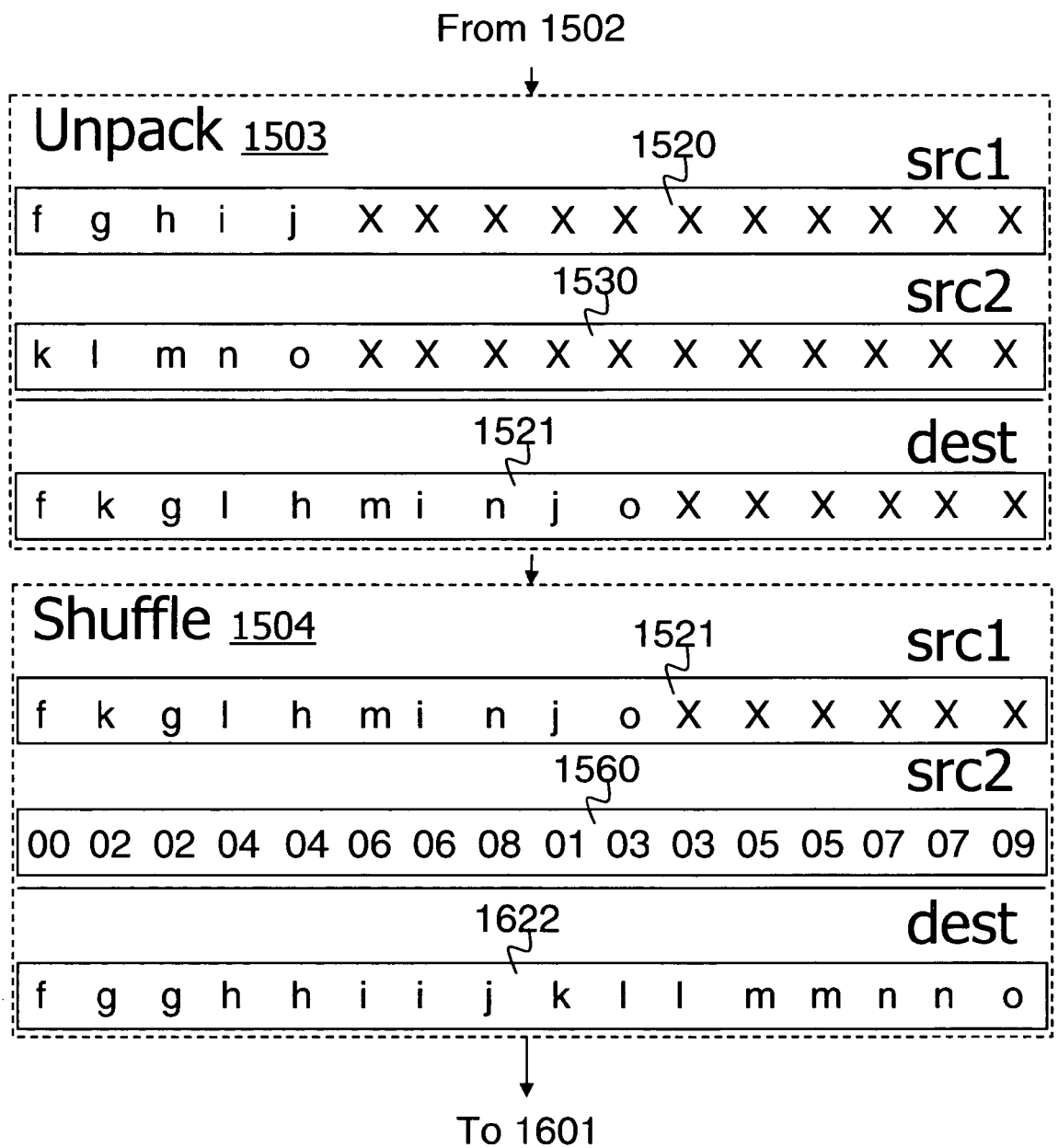

FIGS. 15a-15b illustrate a flow diagram of one alternative embodiment for a process to shuffle content data. In processing block 1501, a line 1510 with 2n+1 byte elements stored in SRC1 and a line 1520 with 2n+1 byte elements stored in SRC2 are unpacked, interleaving the least significant bytes from line 1510 and line 1520 to generate Result 1511 comprising 2 lines of bytes.

In processing block 1502 Result 1511 is shuffled according to according to packed data 1560 stored in SRC2 to generate Result 1612 comprising 2 lines of 4n shuffled elements each. Data of byte elements 1511 in the byte position indicated by said byte element of packed data 1560 is stored to Result 1612 in the byte position corresponding to said byte element of packed data 1560.

In processing block 1503, a line 1520 with 2n+1 byte elements stored in SRC1 and a line 1530 with 2n+1 byte elements stored in SRC2 are unpacked, interleaving the least significant bytes from line 1520 and line 1530 to generate Result 1521 comprising 2 lines of bytes.

In processing block 1504 Result 1521 is shuffled according to according to packed data 1560 stored in SRC2 to generate Result 1622 comprising 2 lines of 4n shuffled elements each. Data of byte elements 1521 in the byte position indicated by said byte element of packed data 1560 is stored to Result 1622 in the byte position corresponding to said byte element of packed data 1560.

Figure 16B:
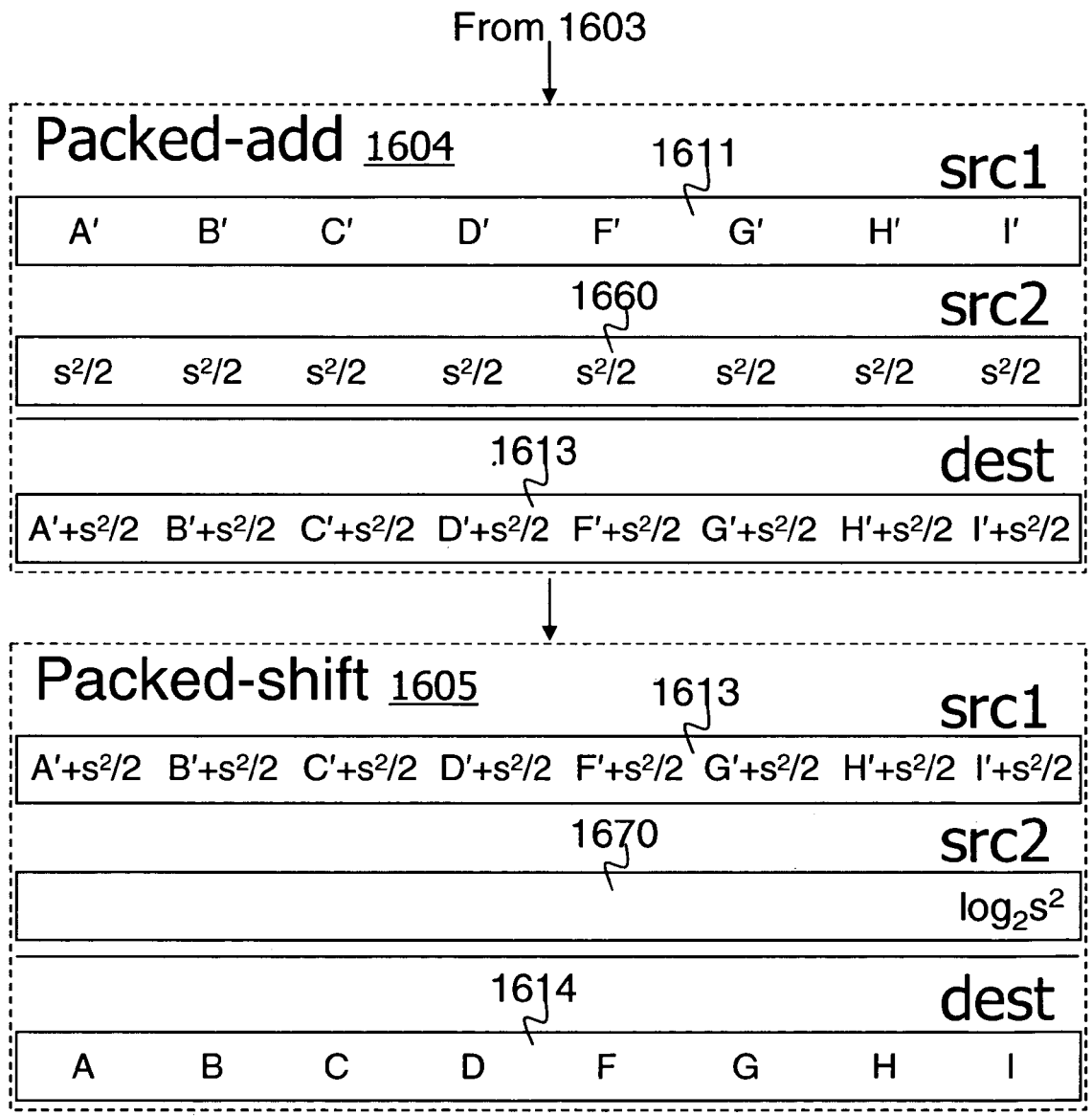

FIGS. 16a-16b illustrate a flow diagram of one embodiment for a process using multiply-add operations to perform hi-linear interpolation and motion compensation. In processing block 1601, a multiply-add operation is performed on the shuffled packed byte data 1612 stored in SRC1 and at least two area coefficients 1640 stored in SRC2 to generated Result 1610 including 16-bit sums of products. in processing block 1602, a multiply-add operation is performed on the second shuffled packed byte data. 1622 stored in SRC1 and at least two more area coefficients 1650 stored in SRC2 to generated Result 1620 including 16-bit sums of products. Processing proceeds to processing block 1603 where a Result 1611 including 4n sums is generated by adding corresponding elements of the packed 16-bit sums of products of Result 1610 and Result 1620 in processing block 1604, rounding is optionally applied to the 4n sums of Result 1611 by adding rounding values ($s^2/2$) from packed data 1660 at the desired bit positions of the elements of Result 1611 to generate Result 1613. in processing block 1605. Result 1614 comprising 4n packed averages over an area ($s^2$) is computed from the 4n packed sums of Result 1613 by shifting the elements of Result 1613 by a shift count substantially equal to the log (base 2) of the area (i.e. $\log_2(s^2)$).

While the invention has been described in terms of several embodiments, those skilled in the art will recognize that the invention is not limited to the embodiments described. For example, numerous alternative orderings of content data and of area coefficients may be employed to effectively use the shuffle instructions and the multiply-add instructions for performing bi-linear interpolation and motion compensation. The description is thus to be regarded as illustrative instead of limiting on the invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims.

What is claimed is:

1. A method for performing a bi-linear interpolation or a motion compensation of a digital image or video, the method comprising:
   decoding a first shuffle instruction in a computer processor including a memory and a first multiply-add instruction, each of an instruction format comprising a first operand field and a second operand field;
   responsive at least in part to said first shuffle instruction, generating, in said processor, a first packed data having a first plurality of byte data elements including an $a_1$ byte data element, and at least two copies of each $a_2$, $a_3$, and $a_4$ byte data elements; and
   responsive to said first multiply-add instruction, wherein the first operand field of said first multiply-add instruction specifies said first packed data and the second operand field specifies a second packed data having a second plurality of byte data elements including at least two copies of each of $b_1$ and $b_2$ byte data elements, performing, in said processor, an operation $(a_1 \times b_1)+(a_2 \times b_2)$ to generate a first 16-bit data element of a third packed data, performing an operation $(a_2 \times b_1)+(a_3 \times b_2)$ to generate a second 16-bit data element of the third packed data, and performing an operation $(a_3 \times b_1)+(a_4 \times b_2)$ to generate a third 16-bit data element of the third packed data.

2. The method of claim 1, further comprising:
   decoding a second shuffle instruction and a second multiply-add instruction, each of an instruction format comprising a first operand field and a second operand field;
   responsive at least in part to said second shuffle instruction, generating a fourth packed data having a fourth plurality of byte data elements including a $c_1$ byte data element, and at least two copies of each of $c_2$, $c_3$, and $c_4$ byte data elements; and
   responsive said second multiply-add instruction, wherein the first operand field of said second multiply-add instruction specifies said fourth packed data and the second operand field of said second multiply-add instruction specifies a fifth packed data having a fifth plurality of byte data elements including at least two copies of each of $d_1$ and $d_2$ byte data elements, performing an operation $(c_1 \times d_1)+(c_2 \times d_2)$ to generate a first 16-bit data element of a sixth packed data, performing an operation $(c_2 \times d_1)+(c_3 \times d_2)$ to generate a second 16-bit data element of the sixth packed data, and performing an operation $(c_3 \times d_1)+(c_4 \times d_2)$ to generate a third 16-bit data element of the sixth packed data.

3. The method of claim 2, further comprising:

decoding a packed add instruction of an instruction format comprising a first operand field and a second operand field;

responsive to said packed add instruction, wherein the first operand field of said packed add instruction specifies said third packed data and the second operand field of said packed add instruction specifies the sixth packed data, adding the first 16-bit data elements of the third and sixth packed data to generate a first 16-bit data element of a seventh packed data, adding the second 16-bit data elements of the third and sixth packed data to generate a second 16-bit data element of the seventh packed data, and adding the third 16-bit data elements of the third and sixth packed data to generate a third 16-bit data element of the seventh packed data.

4. The method of claim 1, said first plurality of byte data elements including at least 16 byte data elements and said second plurality of data elements including at least 16 byte data elements.

5. The method of claim 1, said first plurality of byte data elements including 8 byte data elements and said second plurality of data elements including 8 byte data elements.

6. The method of claim 1 wherein said first plurality of data elements are treated as unsigned bytes.

7. The method of claim 6 wherein said second plurality of data elements are treated as signed bytes.

8. The method of claim 7 wherein each of said first, second and third 16-bit data elements are generated using signed saturation.

9. A processor to perform the method of claim 1 comprising:

an execution unit including one or more execution circuits to execute operations on packed data elements;

at least one state machine; and a machine-accessible medium including data that, when accessed by said at least one state machine, causes said at least one state machine to enable the one or more execution circuits to perform the method of claim 1.

10. The method of claim 1 wherein said first operand field comprises bits five through three of the instruction format.

11. The method of claim 10 wherein said second operand field comprises bits two through zero of the instruction format.

12. The method of claim 11 wherein said first plurality of byte data elements is overwritten by said third packed data responsive to the first multiply-add instruction.

13. A machine-accessible memory medium including data to perform a bi-linear interpolation or a motion compensation of a digital image or video such that, when accessed by one or more machines, causes said one or more machines to:

shuffle a first 2n+1 byte elements of a first line of data to generate a first packed data comprising at least a first 4n byte elements including 2n−1 duplicated elements of the first 2n+1 byte elements;

shuffle a second 2n+1 byte elements of a second line of data to generate a second packed data comprising at least a second 4n byte elements including 2n−1 duplicated elements of the second 2n+1 byte elements;

multiply-add the first packed data with at least a first two byte coefficients to generated a third packed data including sums of products;

multiply-add the second packed data with at least a second two byte coefficients to generated a fourth packed data including sums of products; and add corresponding sums of products of the third and fourth packed data to generate a first packed result.

14. The machine-accessible memory medium of claim 13 including data that, when assessed by said one or more machines, causes said one or machines to treat elements of the first packed data and of the second packed data as unsigned bytes in generating the sums of products of the third packed data and of the fourth packed data respectively.

15. The machine-accessible memory medium of claim 14 including data that, when accessed by said one or more machines, causes said one or more machines to treat elements of said at least the first two byte coefficients and of said at least the second two byte coefficients as signed bytes in generating the sums of products of the third packed data and of the fourth packed data respectively.

16. The machine-accessible memory medium of claim 14 including data that, when accessed by said one or more machines, causes said one or more machines to overwrite the first packed data with the third packed data and to overwrite the second packed data with the fourth packed data.

17. The machine-accessible memory medium of claim 13 including data that, when accessed by said one or more machines, further causes said one or more machines to:

shuffle the second 2n+1 byte elements of the second line of data to generate the first packed data comprising at least the second 4n byte elements including 2n−1 duplicated elements of the second 2n+1 byte elements; and shuffle a third 2n+1 byte elements of a third line of data to generate the second packed data comprising at least a third 4n byte elements including 2n−1 duplicated elements of the third 2n+1 byte elements.

18. The machine-accessible memory medium of claim 17 wherein n is equal to 2 and including data that, when accessed by said one or more machines, further causes said one or more machines to:

generate a second packed result comprising at least $4_n$ rounded averages, each corresponding to an element of said first packed result.

19. An apparatus comprising:

a decoder to decode a plurality of instructions including a shuffle instruction and a multiply-add instruction;

an execution unit including a first execution circuit, enabled by the decoded shuffle instruction, to shuffle a first 2n+1 byte elements of a first line of data to generate a first packed data comprising at least a first 4n byte elements including 2n−1 duplicated elements of the first 2n+1 byte elements, said execution unit further including a second execution circuit, enabled by the decoded multiply-add instruction, to multiply each of a first pair of byte data elements of the first packed data with a first pair of respective byte coefficient elements and to generate a first 16-bit result representing a first sum of products of the first pair of multiplications, and to multiply each of a second pair of byte data elements of the first packed data with a second pair of respective byte coefficient elements and to generate a second 16-bit result representing a second sum of products of the second pair of multiplications;

a first register to store the first packed data in response to the shuffle instruction; and a second register to store a third packed data comprising at least said first and second 16-bit results in response to the multiply-add instruction.

20. The apparatus of claim 19 wherein n is at least two.

21. The apparatus of claim 20 wherein said first packed data contains at least sixteen byte data elements.

22. The apparatus of claim 19 wherein the first packed data comprises unsigned byte data elements.

23. The apparatus of claim 22 wherein said first and second pairs of respective byte coefficient elements comprise signed byte data elements.

24. The apparatus of claim 19 wherein the first and second 16-bit results are generated using signed saturation.

25. A computing system comprising:
an addressable memory to store data;
a processing including:
  a first storage area to store byte data elements of a content data;
  a second storage area to store byte coefficient elements;
  a decoder to decode a plurality of instructions including a first and a second shuffle instruction and a first and a second multiply-add instruction;
  a first execution circuit, enabled by the decoded first shuffle instruction, to shuffle a first 2n+1 byte elements of the content data to generate a first packed data comprising at least a first 4n byte elements including 2n−1 duplicated elements of the first 2n+1 byte elements, and enabled by the decoded second shuffle instruction, to shuffle a second 2n+1 byte elements of the content data to generate a second packed data comprising at least a second 4n byte elements including 2n−1 duplicated elements of the second 2n+1 byte elements;
  a second execution circuit, enabled by the decoded first multiply-add instruction, to multiply each of a first and second pair of byte data elements of the first packed data with respective byte coefficient elements of a third packed data and to generate a first and second 16-bit result respectively representing a first and a second sum of products of the first and the second pair of multiplications, and enabled by the decoded second multiply-add instruction, to multiply each of a third and fourth pair of byte data elements of the second packed data with respective byte coefficient elements of a fourth packed data and to generate a third and a fourth 16-bit result respectively representing a third and a fourth sum of products of the third and the fourth pair of multiplications;
  a third storage area to store packed 16-bit data elements including the first and the second 16-bit results responsive to the first multiply-add instruction; and
  a fourth storage area to store packed 16-bit data elements including the third and the fourth 16-bit result responsive to the second multiply-add instruction; and
  a storage device to store said plurality of instructions.

26. The computing system of claim 25 wherein each of the first, second, third and fourth packed data comprise 16 byte data elements.

27. The computing system of claim 25 wherein each of the first, second, third and fourth packed data comprise 8 byte data elements.

28. The computing system of claim 25 wherein each of said first, second, third and fourth 16-bit results are generated by multiplying unsigned bytes elements of the content data by signed coefficient elements and by adding pairs of products with signed saturation.

29. The computing system of claim 25 wherein said plurality of instructions further includes an unpack instruction to store the byte data elements of the content data in the first storage area and a packed add instruction to add corresponding 16-bit data elements of the third and fourth storage areas.

* * * * *